United States Patent
Bonanni et al.

(10) Patent No.: US 6,466,843 B1
(45) Date of Patent: Oct. 15, 2002

(54) METHOD AND APPARATUS FOR LIFTING OBJECTS

(75) Inventors: Pierino Gianni Bonanni, Clifton Park, NY (US); Kevin George Harding, Niskayuna, NY (US); Appasaheb Ningappa Madiwale, Schenectady, NY (US); Juan Manuel De Bedout, Clifort Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/682,763

(22) Filed: Oct. 16, 2001

(51) Int. Cl.$^7$ ............................................. G06F 19/00
(52) U.S. Cl. ................... 700/245; 700/165; 700/206; 700/247; 700/260; 700/251; 700/252; 700/259; 318/568.11; 901/8; 72/16.2; 72/16.3; 701/301
(58) Field of Search ........................ 700/165, 145, 700/97, 245, 206, 247, 260, 103, 251, 252, 255, 259; 318/568.11; 901/8; 72/16.2, 16.7, 17.3, 422, 424, 446, 472, 481.1; 73/862.043; 701/301

(56) References Cited

U.S. PATENT DOCUMENTS

| | | | | |
|---|---|---|---|---|
| 4,661,680 A | * | 4/1987 | Swensrud | 219/121.78 |
| 4,670,974 A | * | 6/1987 | Antoszewski et al. | 29/701 |
| 4,722,653 A | * | 2/1988 | Williams et al. | 198/346.1 |
| 5,149,353 A | * | 9/1992 | Sipila et al. | 198/345.1 |
| 5,154,561 A | * | 10/1992 | Lee | 114/264 |
| 5,189,493 A | * | 2/1993 | Harding | 250/237 G |
| 5,581,166 A | * | 12/1996 | Eismann et al. | 318/568.18 |
| 5,844,146 A | * | 12/1998 | Murray et al. | 73/862.041 |
| 5,857,377 A | * | 1/1999 | Sartorio | 483/14 |
| 5,889,926 A | * | 3/1999 | Bourne et al. | 700/255 |
| 5,894,754 A | * | 4/1999 | Sartorio | 483/14 |
| 5,950,485 A | * | 9/1999 | Sartorio | 72/422 |
| 6,067,862 A | * | 5/2000 | Murray et al. | 73/862.043 |
| 6,269,763 B1 | * | 8/2001 | Woodland | 114/144 A |

FOREIGN PATENT DOCUMENTS

| | | |
|---|---|---|
| WO | 9013091 | 11/1990 |
| WO | 9936216 | 7/1999 |

OTHER PUBLICATIONS

Zhang, Integrated motion control for the robotic bridge maintenance system, 1998, Internet, pp. 1–223.*
Kavoussanos et al., Cost Effective industrial robotic systems, UNK, Internet, pp. 1–6.*
Hashimoto et al., Object–transportation control by multiple wheled vehicle–lanar Cartesian manipulator systems, 1995, IEEE, pp. 2267–2272.*
Houshangi, Umbilical positioning using ultrasonic sensors, 2000, IEEE, pp. 499–503.*
Huang et al., Time–optimal control for a robottic controur following problem, 1988, IEEE, pp. 140–140.*
Pikkarainen et al., Experiments to achieve accurate vision guided robot movements, no date, Internet, pp. 1–5.*
Hashimoto et al., Object–transportation control by multiple wheeled vehicle–lanar cartesian manipulator systems, 1995, Internet/IEEE, pp. 2267–2272.*
Bailey et al., Remote pit operation enhancement system: Concept selection method adn evaulaltion criteria, 1999, Internet, entire document.*
Jae S. Lim, "Two–Dimensional Signal and Image Processing", Signals, Systems and the Fourier Transform, Chap. 1, Sec. 1.4.3, 1990, pp. 42–45.

* cited by examiner

Primary Examiner—William A. Cuchlinski, Jr.
Assistant Examiner—McDieunel Marc
(74) Attorney, Agent, or Firm—George C. Goodman; Patrick K. Patnode

(57) ABSTRACT

In one embodiment of the present invention, a system for lifting objects comprises a Cartesian manipulator, a machine vision system for acquiring video images of the objects, and a control processor for processing the video images and providing position command signals to the Cartesian manipulator.

112 Claims, 17 Drawing Sheets

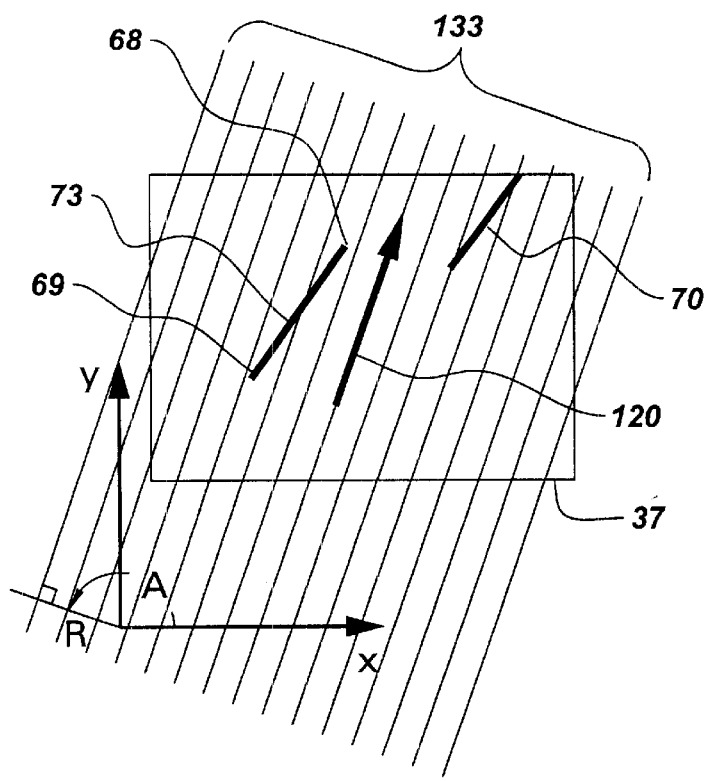
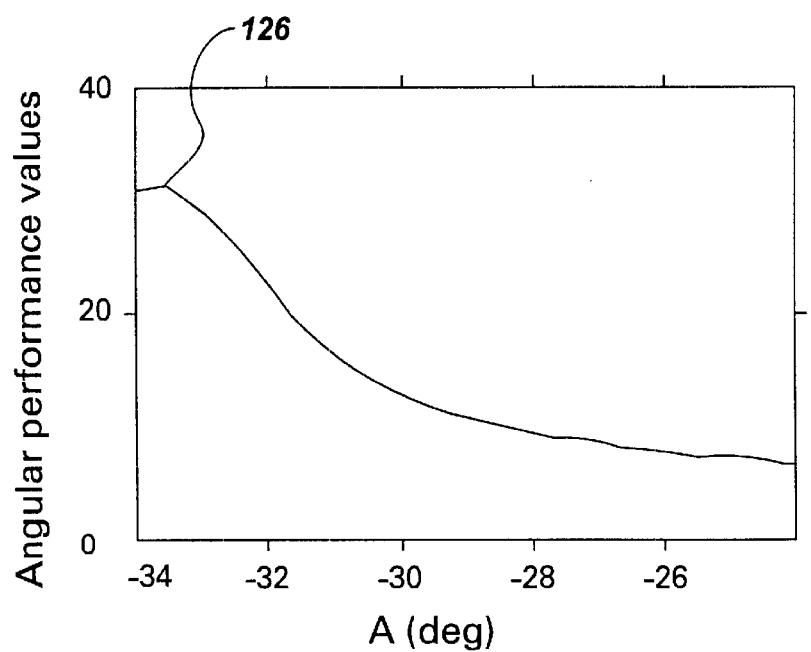
Fig. 10

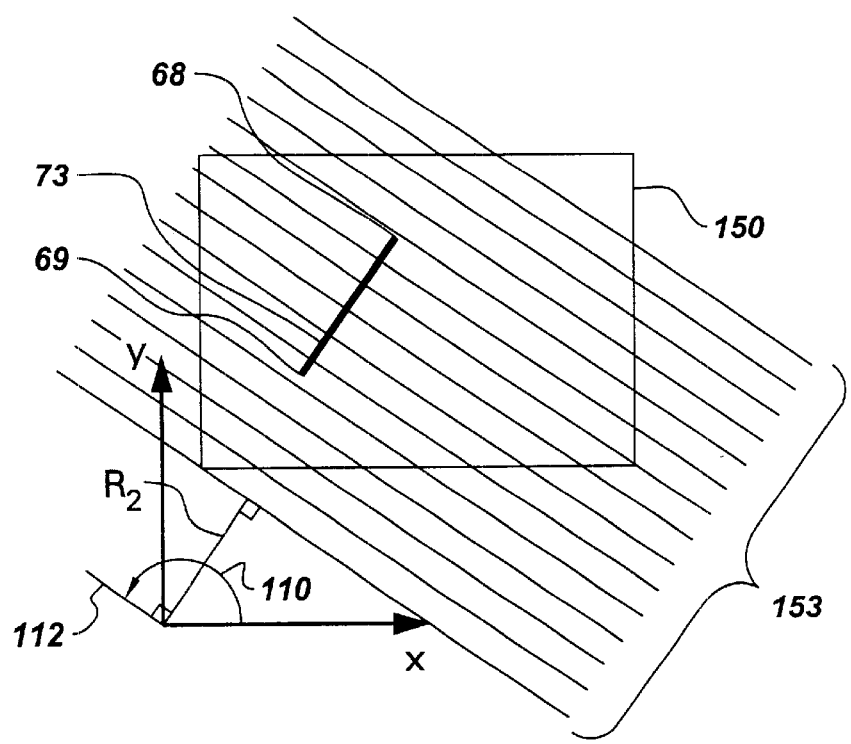
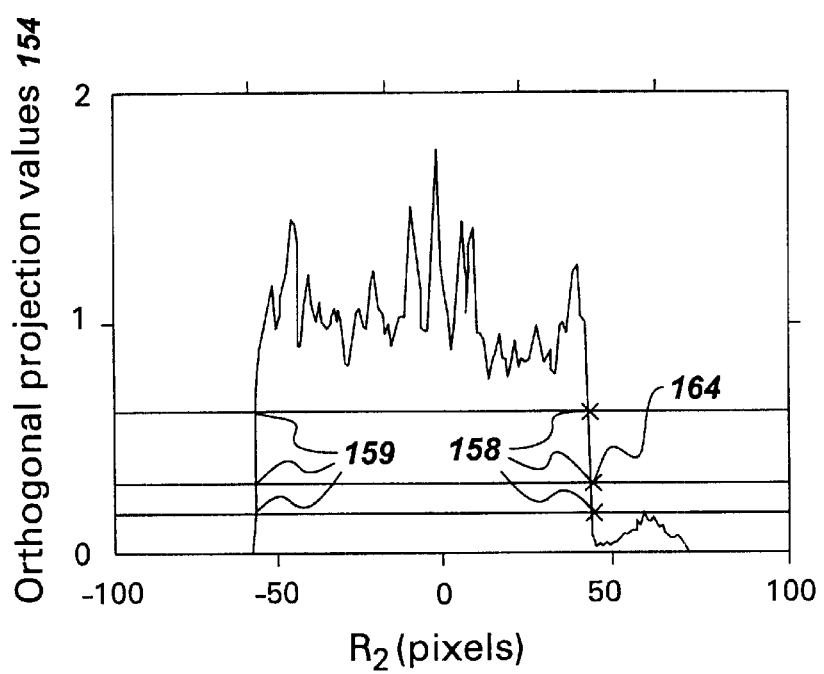
Fig. 14

METHOD AND APPARATUS FOR LIFTING OBJECTS

BACKGROUND OF INVENTION

The present invention relates generally to the use of robotic manipulators for lifting objects and particularly to the use of machine vision systems to aid in locating such objects.

In a wide variety of industrial applications, powered mechanical manipulators are used to lift and move objects from one place to another. When a powered mechanical manipulator is adapted to respond to a signal input (i.e., adapted for automatic operation) the powered mechanical manipulator is referred to as a "robotic manipulator." Examples of such powered mechanical manipulators include forklifts, backhoes, jib cranes, gantry cranes, master-slave manipulators, and pick-and-place robots. In all applications of powered mechanical manipulators, the location of a target object to be lifted must be known to an accuracy high enough to ensure a successful lifting operation.

In one class of applications, such as, for example, automated circuit board assembly using a pick-and-place robot, location information is conventionally maintained by using a precision feed mechanism to accurately deliver target objects to known locations. An opportunity exists, in some instances of this application class, to gain economic advantage by replacing the expensive precision feed mechanism with a less expensive coarse feed mechanism combined with an automated target object location measurement system.

Similarly, in another class of applications, such as, for example, moving steel slabs in a steel mill using a gantry crane, location information is conventionally maintained by using a human operator to visually acquire target object locations. An opportunity exists, in some instances of this application class, to gain economic advantage by adapting the gantry crane for automatic operation and replacing the human operator with an apparatus for locating target objects.

SUMMARY OF INVENTION

The opportunities described above are addressed, in one embodiment of the present invention, by a system for lifting objects comprising: a Cartesian manipulator; a machine vision system adapted to acquire video images of the objects to be lifted; and a control processor adapted to process the video images and provide position command signals to the Cartesian manipulator.

The opportunities described above are further addressed, in another embodiment of the present invention, by an apparatus for locating a polygonal object comprising: a machine vision system for acquiring a video image of the polygonal object, at least one component of the machine vision system being disposed on a component carrying link of a robotic manipulator; an edge point locator for locating, in the video image, a new edge point corresponding to a respective edge of the polygonal object; an edge point accumulator for incorporating the new edge point into a historical point set; an edge line computer for computing a plurality of edge lines from the historical point set; a polygon center computer for computing a polygon center from the edge lines; and a manipulator command generator for commanding the robotic manipulator to move an end effector toward the polygon center by moving the component carrying link.

In some instances, it is also desirable, especially at the onset of lifting, to detect whether an object is tilted with respect to the horizontal. In another embodiment of the present invention, detection of tilt is addressed by an apparatus for detecting a tilted object comprising: a critical angle estimator for estimating a critical angle from a video image; an angle differencer for differencing the critical angle from the reference angle of a reference ray to yield an error angle; and an angle tolerance comparator for comparing an absolute value of the error angle to an angle error tolerance.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 10 illustrates computation of a projection array;

FIG. 14 illustrates computation of orthogonal projection values;

DETAILED DESCRIPTION

Figure 1:
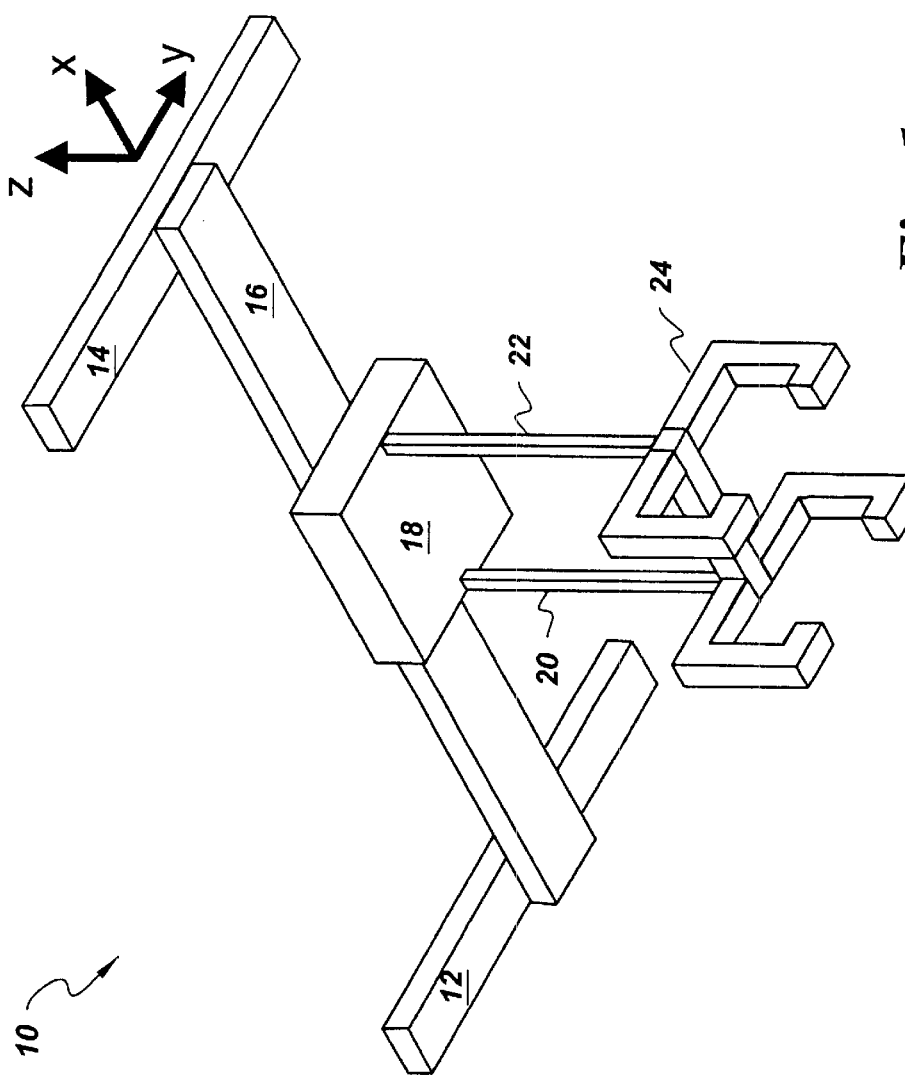
FIG. 1 is a schematic isometric view of a conventional Cartesian manipulator.

FIG. 1 is a schematic isometric view of a conventional Cartesian manipulator 10.

The term "Cartesian" refers to the fact that individual links of Cartesian manipulator 10 enable and constrain motion along respective individual axes of a Cartesian (i.e., rectangular) coordinate frame. FIG. 1 shows a Cartesian manipulator geometry typical of a gantry crane in which a pair of rails 12, 14 enable and constrain motion along a transverse axis y; a bridge 16 enables and constrains motion along a horizontal axis x;

and a trolley 18 enables and constrains motion along a vertical axis z by extending and retracting a pair of trolley support cables 20, 22. Rails 12, 14 are "grounded" by any one of a variety of means, such as, for example, by standing on support legs extending to the ground, or by hanging from an enclosing structure which stands on the ground (not shown). In one example, bridge 16 is fixed to rails 12, 14; rails 12,14 are standing on support legs equipped with wheels; and the transverse axis y motion is provided by rolling on the support leg wheels (not shown). As used herein, "links" of Cartesian manipulator 10 typically include the ground as well as rails 12, 14, bridge 16, and trolley 18. An end effector 24, shown schematically for purposes of example as a pincer-type end effector, hangs from trolley support cables 20, 22 and interacts with objects to be lifted. Other examples of end effector 24 include, without limitation, vacuum cups and magnetic lifters.

Figure 2:
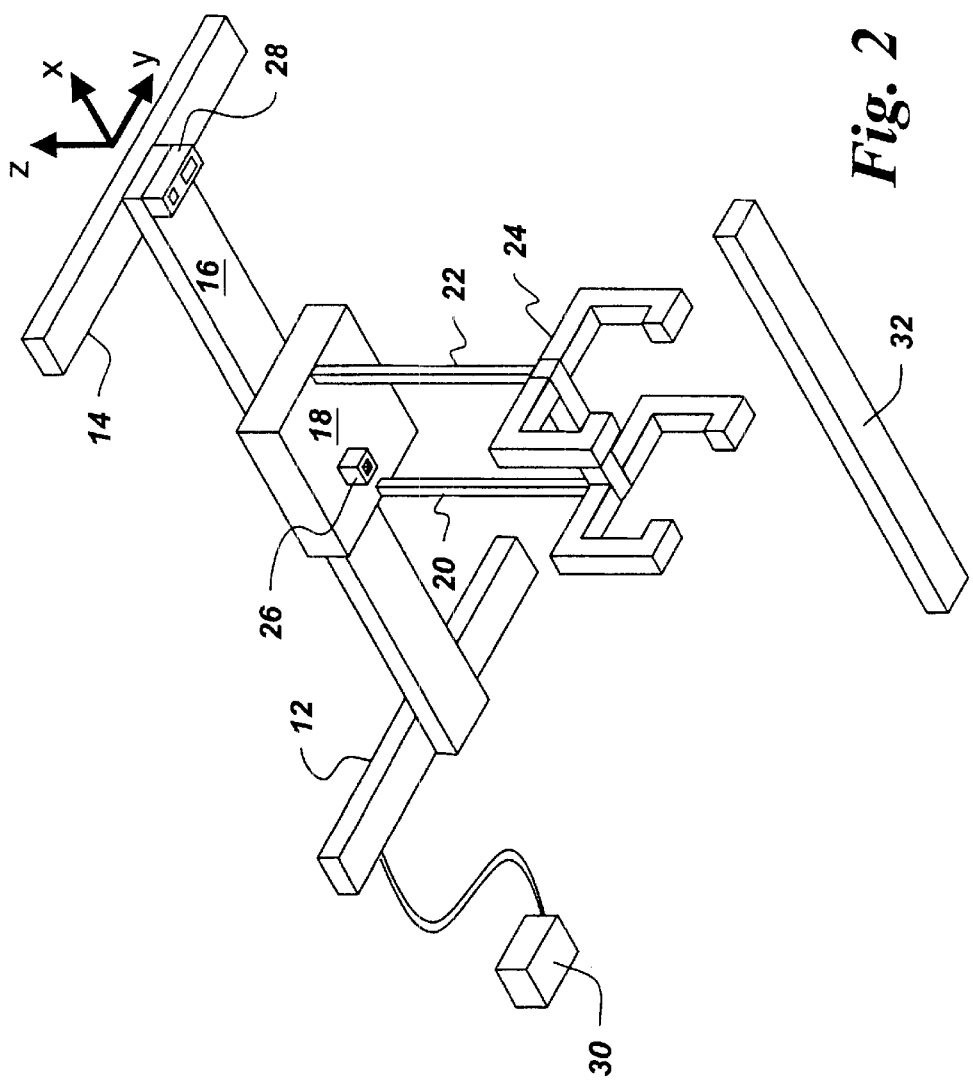
FIG. 2 is a schematic isometric view of a system for lifting objects according to one embodiment of the present invention.

According to one embodiment of the present invention, FIG. 2 is a schematic isometric view of a system for lifting objects 32 comprising a Cartesian manipulator 10 (also called "robotic manipulator 10"), a machine vision system 28, and a control processor 30. Machine vision system 28 provides video images of objects 32 to control processor 30 which processes video images to provide position command signals to Cartesian manipulator 10. Examples of Cartesian manipulator 10 include, without limitation, gantry cranes and pick-and-place robots. Examples of machine vision system 28 include, without limitation, video cameras and photo-diode arrays and may additionally include, without limitation, sources of illumination such as, for example, floodlights, spotlights, or structured light projectors. Examples of control processor 30 include, without limitation, analog electronic computation modules and digital electronic computation modules including, without limitation, array processors, microcomputers, microprocessors, microcontrollers, and single-chip digital signal processors (DSPs).

In a more detailed embodiment of the present invention in accordance with the embodiment of FIG. 2, control processor 30 implements a polygonal object location method described in detail below. As used herein, a "polygonal object" is a polyhedral object in which top and bottom faces are polygons in horizontal planes spanned by horizontal axis x and transverse axis y and in which no portion of the bottom face is visible when viewed along vertical axis z. For the purpose of being lifted from above by pincer-type end effector 24, it is sufficient to locate a polygonal object of known height by locating its top face in a horizontal plane.

In a more detailed embodiment of the present invention in accordance with the embodiment of FIG. 2, Cartesian manipulator 10 comprises a gantry crane.

One embodiment of the present invention in accordance with the embodiment of FIG. 2 further comprises a distance sensor 26 which acquires object height measurements of objects 32. Control processor 30 uses the object height measurements to transform two-dimensional video image coordinates into three-dimensional spatial coordinates and also to calculate initial values of a reference ray for use in a projection-based polygonal object location method (described in detail below) to provide position command signals to Cartesian manipulator 10.

Figure 3:
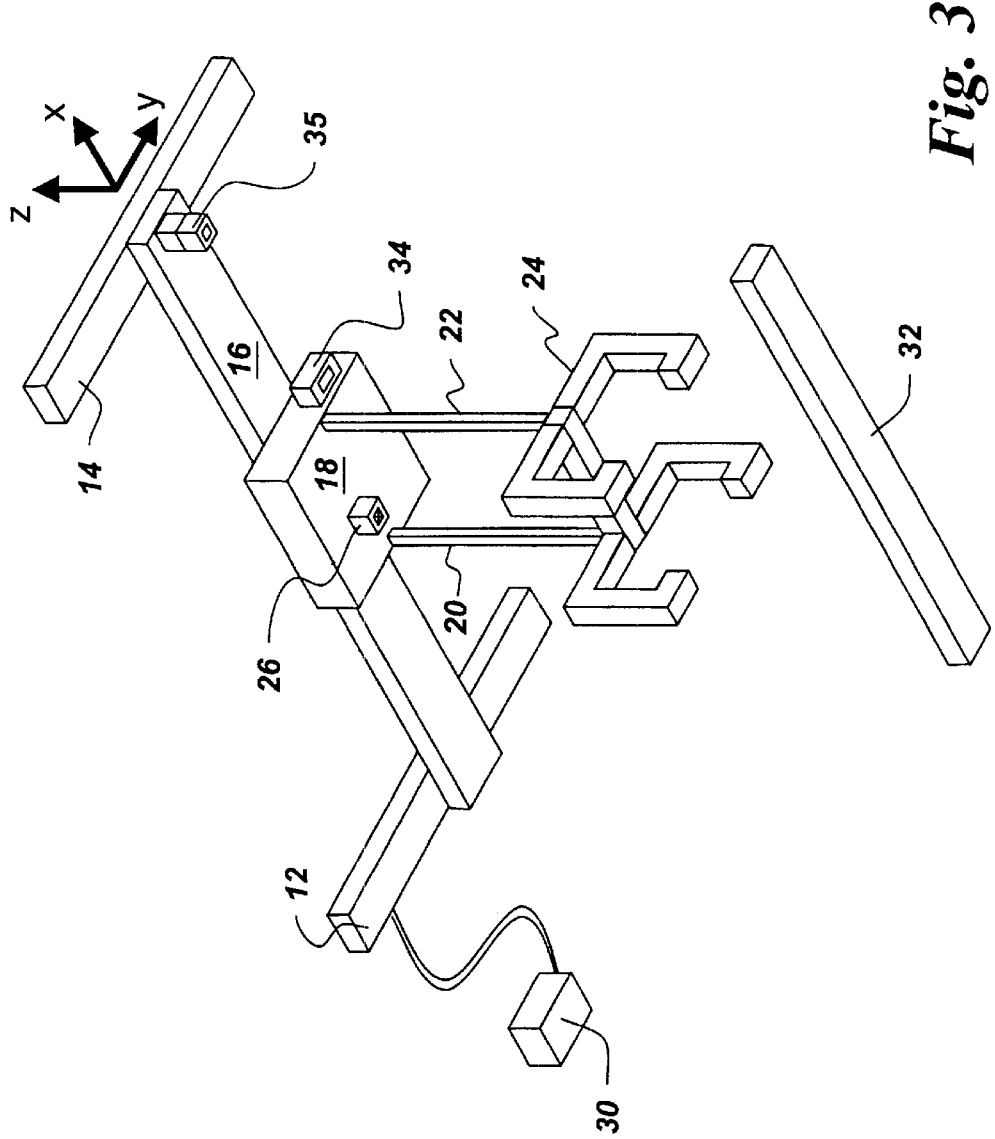
FIG. 3 is a schematic isometric view of a more detailed embodiment of the present invention in accordance with the embodiment of FIG. 2.

FIG. 3 is a schematic isometric view of another more detailed embodiment of the present invention, in accordance with the embodiment of FIG. 2, in which machine vision system 28 comprises a structured light projector 34 and a video camera 36.

Structured light projector 34 illuminates objects 32 by projecting known patterns. For example, without limitation, such known patterns may comprise planes, lines, circles, or grids. Video camera 36 views illuminated objects 32 and provides video images to control processor 30. In some embodiments in accordance with the embodiment of FIG. 3, structured light projector 34 and video camera 36 are disposed on the same link of Cartesian manipulator 10.

In alternative embodiments in accordance with the embodiment of FIG. 3, structured light projector 34 is disposed on a first link of Cartesian manipulator 10 and video camera 36 is disposed on a second link of Cartesian manipulator with the first link being different from the second link. In some applications, the disposition of structured light projector 34 and video camera 36 on different links provides a performance advantage over a disposition on the same link. For example, compared to a structured light projector 34 disposed on bridge 16, a structured light projector 34 disposed on trolley 18 provides the same illumination at lower power, and hence lower cost, because of being closer to target object 32. Hence, trolley 18 is an advantageous location for structured light projector 34. In contrast, compared to a video camera 36 disposed on trolley 18, a video camera 36 disposed on bridge 16 views a more distorted structured light pattern, hence a stronger signal, because of a sharper viewing angle. Hence, bridge 16 is an advantageous location for video camera 36. It should be noted that the advantage of being able to dispose structured light projector 34 and video camera 36 on different manipulator links partially accrues from the fact that robotic manipulator 10 is a Cartesian manipulator. In other manipulator geometries, such as, for example, serial link robots with revolute joints, the relative motions of the links alter the viewed illumination patterns in ways that are far more complex than the relatively simple alterations which occur in the Cartesian geometry. Likewise, the possibilities of transformational singularities and accidental occlusion of the illumination source are far greater in manipulators based on other geometries than in Cartesian manipulators.

In an alternative embodiment of the present invention in accordance with the embodiment of FIG. 3, video camera 36 comprises an optical bandpass filter 35 and structured light projector 34 comprises a substantially monochromatic light source having a wavelength within a wavelength pass band of optical bandpass filter 35. The use of monochromatic light and optical filters substantially eliminates spurious images from a video signal such that the remaining video signal retains only the distorted known patterns projected by structured light projector 34. In some embodiments of the present invention, the wavelength pass band begins at about 520 nanometers and ends at about 540 nanometers. Examples of substantially monochromatic light sources include, without limitation, arc lamps and lasers.

Figure 4:
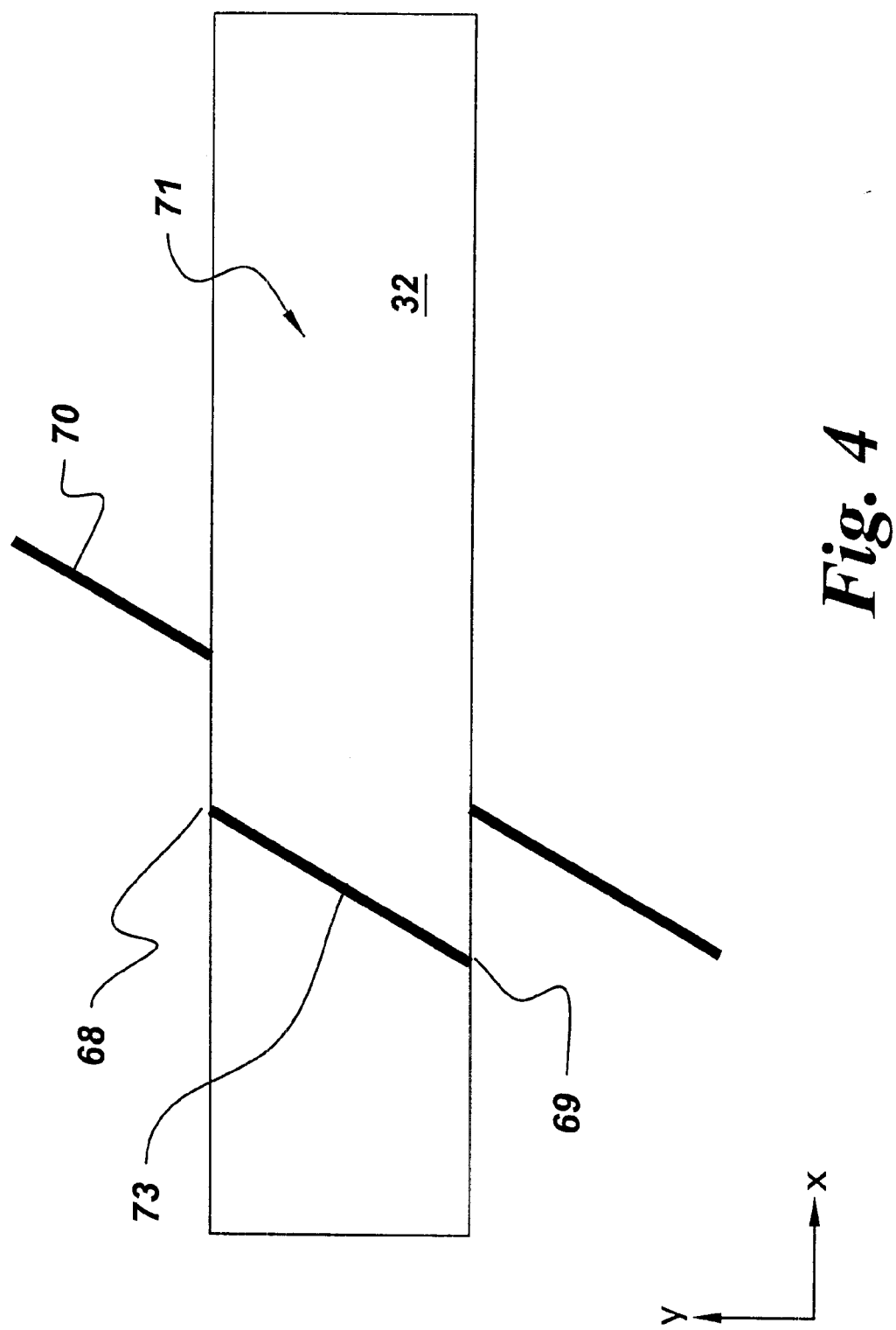
FIG. 4 illustrates a structured light line illuminating a target object.

In another more detailed embodiment of the present invention in accordance with the embodiment of FIG. 3, structured light projector 34 comprises a light plane projector. As FIG. 4 illustrates, projecting a light plane so as to intersect a horizontal face 71 of polygonal object 32 produces a structured light line 70, 73 in a video image. Line breaks 68, 69 in structured light line 70, 73 occur at edges of polygonal object 32. Points on the edges of polygonal object 32 may therefore be located by locating line breaks 68, 69 in the video image.

Figure 5:
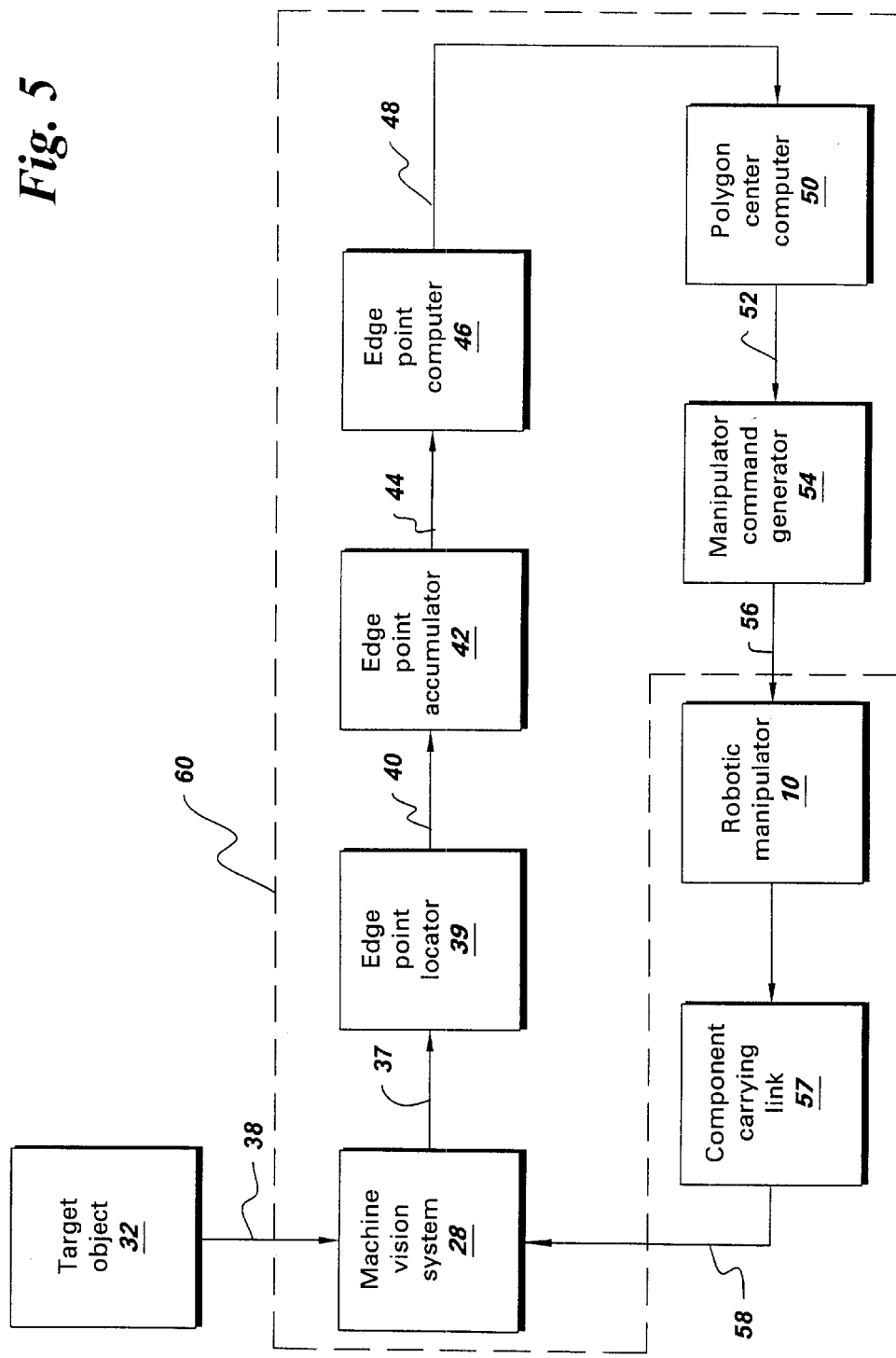
FIG. 5 is a block diagram of an apparatus for locating a polygonal object in accordance with another embodiment of the present invention.

In accordance with another embodiment of the present invention, FIG. 5 is a block diagram of an apparatus 60 for locating a polygonal object (i.e., for implementing a polygonal object location method). Apparatus 60 comprises a machine vision system 28, an edge point locator 39, an edge point accumulator 42, an edge line computer 46, a polygon center computer 50, and a manipulator command generator 54. Edge point locator 39, edge point accumulator 42, edge line computer 46, polygon center computer 50, and manipulator command generator 54 may be realized individually or in combination as computational modules, examples of which include, without limitation, analog electronic computation modules and digital electronic computation modules including, without limitation, array processors, microcomputers, microprocessors, microcontrollers, and single-chip digital signal processors (DSPs).

Machine vision system 28 acquires a video image 37 of polygonal object (target object) 32. Edge point locator 39 locates, in video image 37, a (meaning at least one) new edge point 40 corresponding to a (meaning at least one) respective edge of polygonal object 32. Edge point accumulator 42 incorporates new edge point 40 into a historical point set 44 from which edge line computer 46 computes a plurality of edge lines 48. From edge lines 48, polygon center computer 50 computes a polygon center 52. Manipulator command generator 54 commands robotic manipulator 10 to move an end effector 24 (FIG. 3) toward polygon center 52 by moving a component carrying link 57 on which at least one component of machine vision system 28 is disposed. By moving component carrying link 57 to a new link position 58 relative to object location 38, either a new state of illumination or a new camera vantage point will be established, resulting in a new video image 37. The foregoing polygonal object location method may then be repeated using the new video image 37 to enlarge historical point set 44 thereby enhancing the computation of edge lines 48 and refining the computation of polygon center 52. In some embodiments of the present invention, the refinement of polygon center 52 stops when successive computations differ by less than a prescribed polygon center tolerance selected small enough to ensure capture of target object 32 (FIG. 3) yet large enough to avoid undue computational burden.

Figure 6:
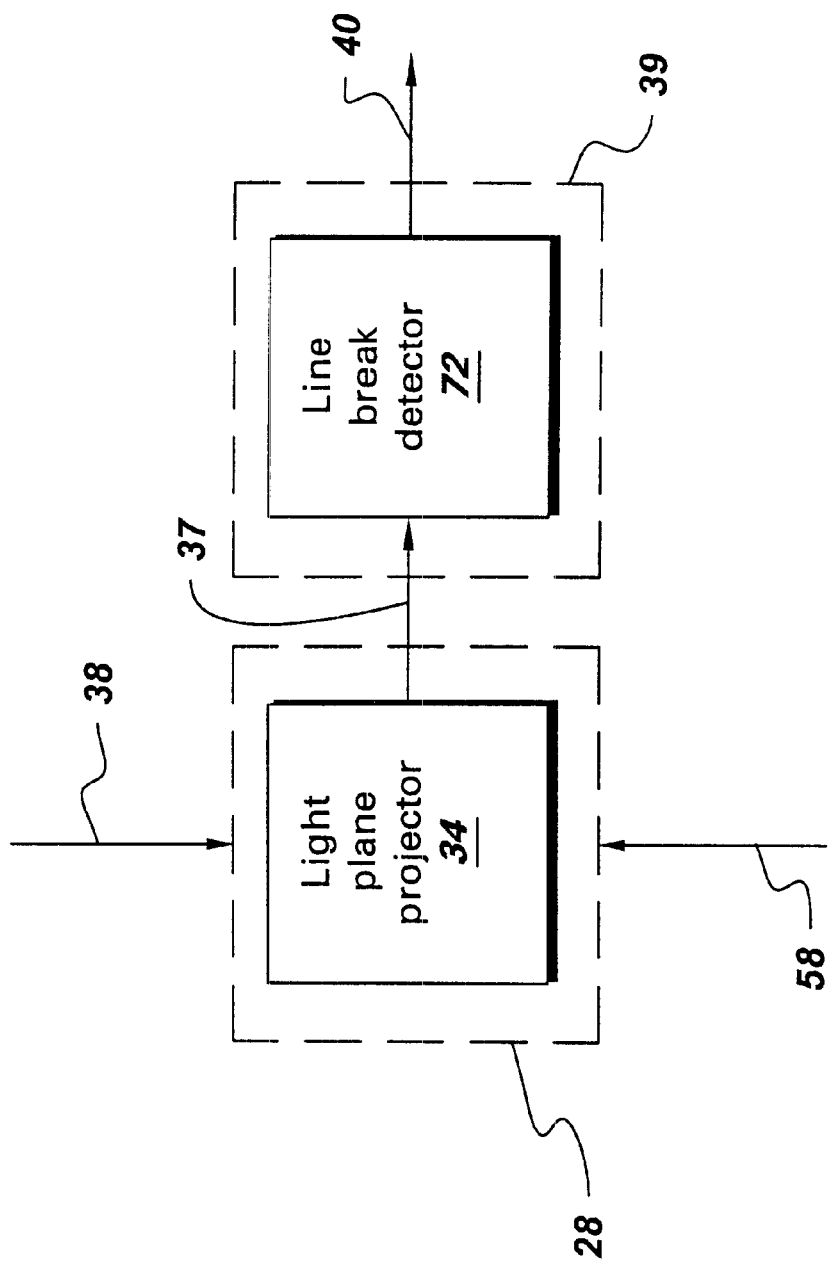
FIG. 6 is a block diagram of a more specific embodiment of the present invention in accordance with the embodiment of FIG. 5.

In accordance with the embodiment of FIG. 5, FIG. 6 is a block diagram of a more specific embodiment of the present invention wherein machine vision system 28 comprises a light plane projector 34, and edge point locator 39 comprises a line break detector 72. Light plane projector 34 projects a light plane to intersect a horizontal face of the polygonal object whereby video image 37 comprises at least one structured light line somewhere in video image 37 depending on link position 58 and object location 38. Line break detector 72 detects a line break 68, 69 (FIG. 4) in structured light line 70, 73 (FIG. 4) thereby locating new edge point 40.

Figure 7:
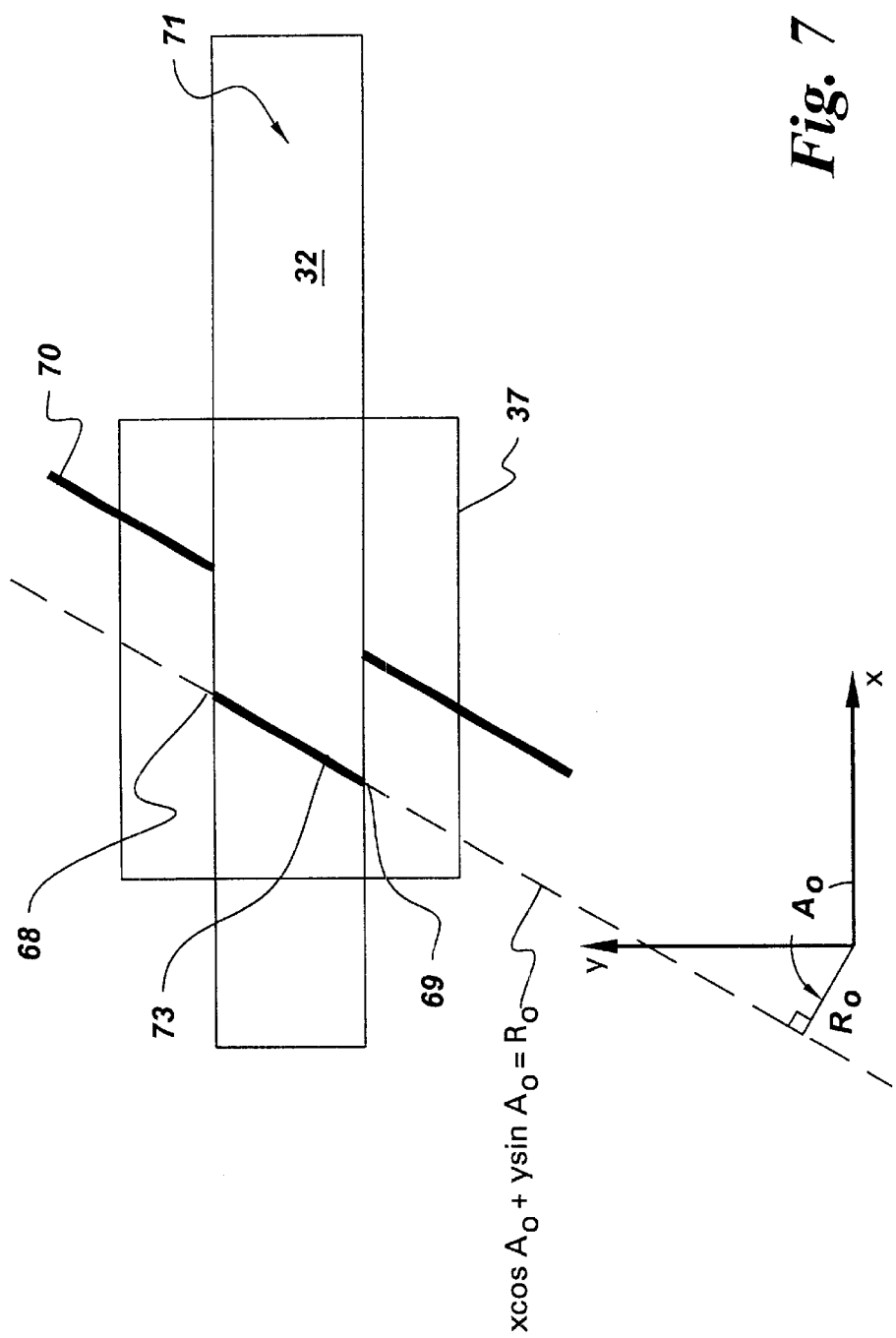
FIG. 7 illustrates parameterization of a line using an offset and an angle.

In attempting to identify structured light line 73 in video image 37, it is convenient to parameterize an equation of structured light line 73 in terms of an offset $R_o$ and an angle $A_o$ as illustrated in FIG. 7. The equation of structured light line 73 in this parameterization is $x \cos A_o + y \sin A_o = R_o$ where x, y are Cartesian coordinates with respect to horizontal axis x and transverse axis y, respectively.

Figure 8:
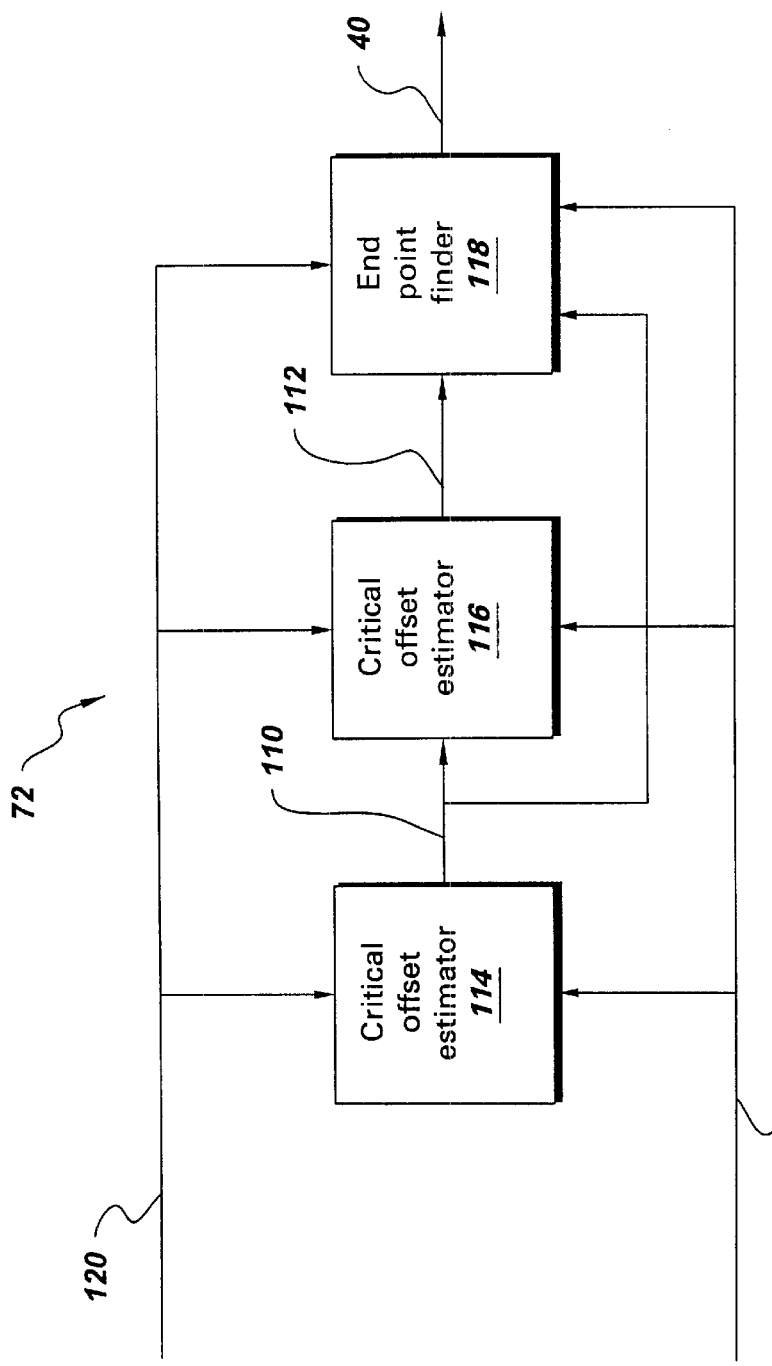
FIG. 8 is a block diagram of still another more specific embodiment of the present invention in accordance with the embodiment of FIG. 5.

In accordance with the embodiment of FIG. 6, FIG. 8 is a block diagram of a more specific embodiment of the present invention wherein line break detector 72 comprises a critical angle estimator 114, a critical offset estimator 116, and an end point finder 118. Critical angle estimator 114 estimates a critical angle 110, an approximation to angle $A_o$, from which critical offset estimator 116 estimates a critical offset 112, an approximation to $R_o$. Using critical angle 110 and critical offset 112, end point finder 118 finds new edge point 40 at line break 68 (FIG. 7).

Figure 9:
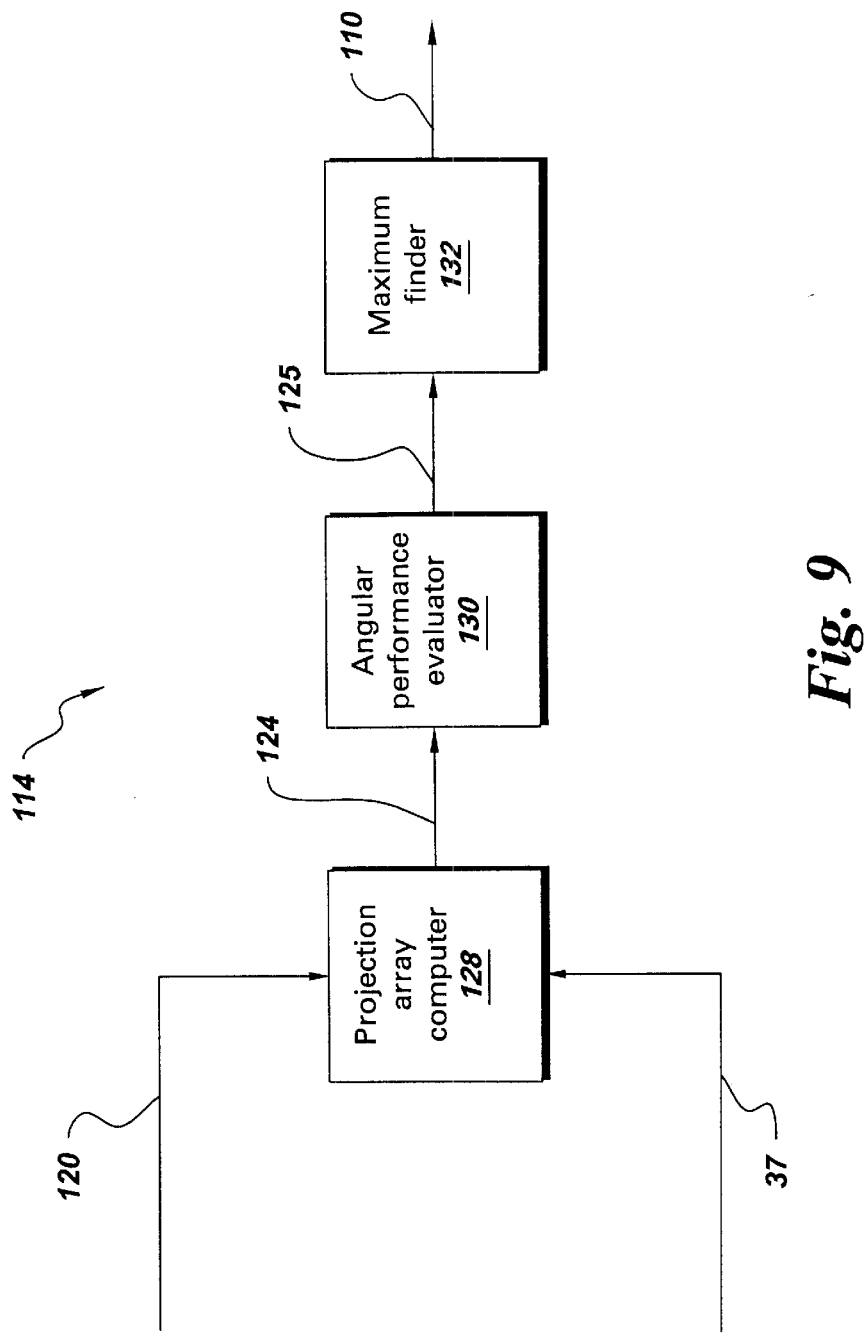
FIG. 9 is a block diagram of a more specific embodiment of the present invention in accordance with the embodiment of FIG. 8.

In accordance with the embodiment of FIG. 8, FIG. 9 is a block diagram of a more specific embodiment of the present invention wherein critical angle estimator 114 comprises a projection array computer 128, an angular performance evaluator 130, and a maximum finder 132. From video image 37, projection array computer 128 computes a projection array 124 having a plurality of projection array rows and a plurality of projection array columns. Each of the projection array columns corresponds to a respective projection angle and comprises a plurality of column elements. Angular performance evaluator 130 computes a respective angular performance value 125 from each of the projection array columns, thereby "collapsing" two-dimensional projection array 124 into a one-dimensional plurality of angular performance values 125. Maximum finder 132 finds a maximum performance value, among angular performance values 125, corresponding to critical angle 110.

In a more detailed embodiment of the embodiment of FIG. 9, angular performance evaluator 130 computes angular performance values 125 by a method comprising finding, for each respective one of the projection array columns, a maximum column value among the column elements. In an alternative embodiment, angular performance evaluator 130 computes each of angular performance values 125 by a method comprising forming a plurality of column element differences from the column elements of a respective projection array column and calculating a square root of a sum of squares of all of the column element differences.

FIG. 10 illustrates an example computation of projection array 124. Video image 37 is shown comprising structured light lines 70 and 73 with a reference ray 120 superimposed (i.e., not part of the video image). Video image 37 comprises a two-dimensional array of pixel (picture element) values, each pixel value being a function of an image brightness at a pixel location. Reference ray 120 represents a best a priori (i.e., prior to the most recent acquisition of video image 37) approximation to structured light line 73 with a reference ray origin (i.e., a starting point) computed to be on horizontal face 71 of polygonal object 32 (FIG. 4). An arrowhead indicates a direction for reference ray 120, the direction being sequentially chosen among a prescribed set of candidate directions designed to discover all edges of polygonal object 32 (FIG. 4). For purposes of illustration, FIG. 10 shows a grossly exaggerated discrepancy between reference ray 120 and structured light line 73.

Conceptually, the computation of projection array 124 proceeds as follows. Offset R and angle A are each varied over respective prescribed ranges designed so as to ensure capturing structured light line 73. In some embodiments, the prescribed ranges are chosen to be a neighborhood of reference ray 120. For each particular value of offset R and each particular value of angle A, a sum of pixel values along a respective one of projection lines 133 is computed and stored in projection array 124 in a respective projection array row corresponding to the particular value of offset R and in a respective projection array column corresponding to the particular value of angle A.

Practically, however, the computation of projection array 124 is typically accomplished through more indirect but relatively more computationally stable means. Also known as a "Radon transform," the computation of projection array 124 is typically accomplished using discrete Fourier transform techniques and known mathematical relationships between Radon and Fourier transforms (see, for example, Lim, Jae S., Two-Dimensional Signal and Image Processing, Prentice-Hall, Inc., New Jersey, 1990, pp. 42–45).

FIG. 10 also shows a graph of typical angular performance values 125 versus angle A and illustrates maximum performance value 126. As shown in the graph, corresponding critical angle 110 is approximately −33 degrees.

Figure 11:
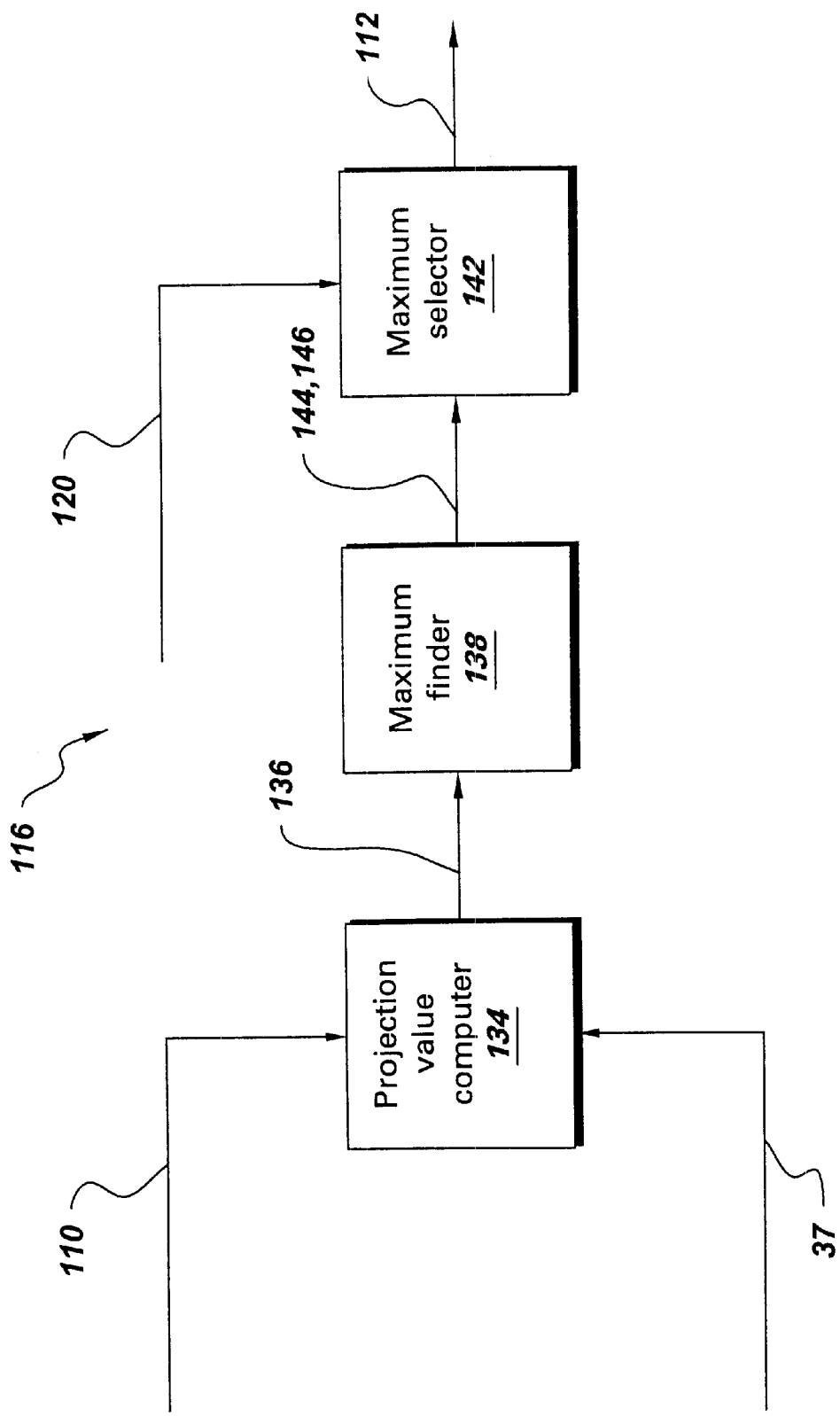
FIG. 11 is a block diagram of another more specific embodiment of the present invention in accordance with the embodiment of FIG. 8.

In accordance with the embodiment of FIG. 8, FIG. 11 is a block diagram of another more specific embodiment of the present invention wherein critical offset estimator 116 comprises a projection value computer 134, a maximum finder 138, and a maximum selector 142. Projection value computer 134 computes, from video image 37, a plurality of critical angle projection values 136 all at the same critical angle 110. Maximum finder 138 finds, among critical angle projection values 136, at least one relative maximum projection value 144, 146 respectively corresponding to at least one relative maximum offset. Maximum selector 142 then selects critical offset 112 among the at least one relative maximum offset.

Figure 12:
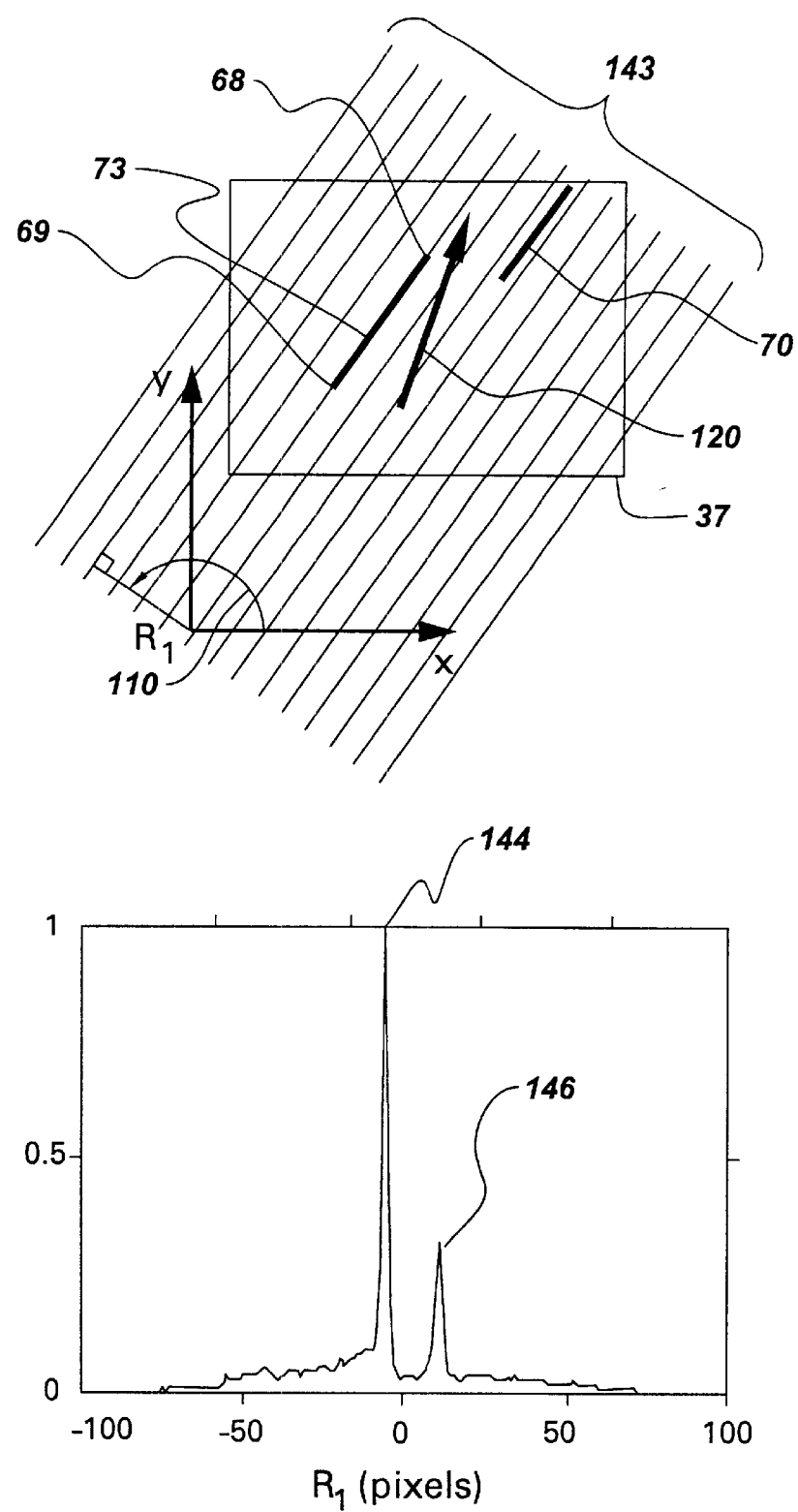
FIG. 12 illustrates computation of critical angle projection values.

FIG. 12 illustrates a computation of critical angle projection values 136 for estimating critical offset 112. The computation is similar to the computation of projection array 124 except that the angle is held fixed at critical angle 110 and only offset $R_1$ is varied. Critical angle projection values 136 are thus computed along critical angle projection lines 143. FIG. 12 also shows a typical graph of critical angle projection values 136 versus offset $R_1$ and illustrates two relative maximum projection values 144 and 146. In one embodiment of the present invention, maximum selector 142 selects critical offset 112 as being the closest, among the at least one relative maximum offset, to a reference offset of reference ray 120.

Figure 13:
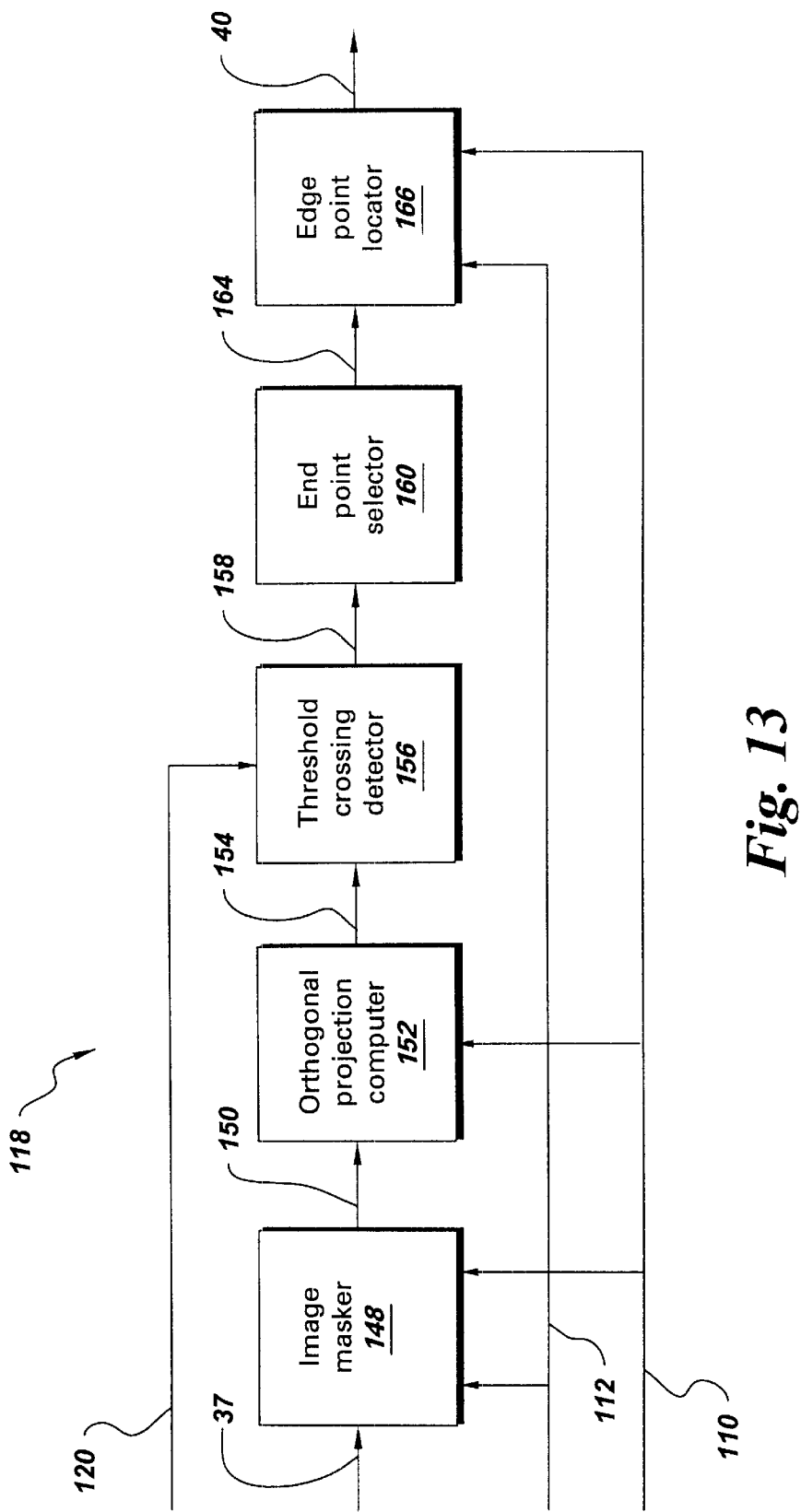
FIG. 13 is a block diagram of still another more specific embodiment of the present invention in accordance with the embodiment of FIG. 8.

In accordance with the embodiment of FIG. 8, FIG. 13 is a block diagram of still another more specific embodiment of the present invention wherein end point finder 118 comprises an image masker 148, an orthogonal projection computer 152, a threshold crossing detector 156, and an end point selector 160. Image masker 148 masks video image 37 in a neighborhood of a line defined by critical angle 110 and critical offset 112 to yield a masked image 150. As used herein, "masking in a particular neighborhood" refers to removing all image information outside the particular neighborhood. Orthogonal projection computer 152 computes a plurality of orthogonal projection values 154 in a direction orthogonal to critical angle 110. Threshold crossing detector 156 detects a plurality of line segment offsets 158 at which orthogonal projection values 154 cross respective ones of a plurality of end point threshold values in a direction defined by a reference ray 120. Among line segment offsets 158, end point selector 160 selects line segment endpoint 164. In typical embodiments, three end point threshold values are used and end point selector 160 chooses a middle value of three line segment offsets 158 as line segment endpoint 164.

FIG. 14 illustrates a computation of orthogonal angle projection values 136 for finding line segment endpoint 164. The computation is similar to the computation of critical angle projection values 136 (FIG. 12) except that the angle is held fixed at an angle 90 degrees removed from critical angle 110 and only offset $R_2$ is varied. Orthogonal angle projection values 154 are thus computed along orthogonal angle projection lines 153. FIG. 14 also shows a typical graph of orthogonal angle projection values 154 versus offset $R_2$ and illustrates crossing three endpoint threshold values at three line segment offsets 158. A middle value of three line segment offsets 158 is indicated as line segment endpoint 164. Because the reference ray origin lies on a horizontal face of the target object, an offset corresponding to the reference ray origin occurs somewhere in the graph to the left of line segment offsets 158 and to the right of spurious threshold crossings 159. As the direction of the reference ray is to the right, in this example, line segment offsets 158 are indicated for further processing rather than spurious threshold crossings 159.

Figure 15:
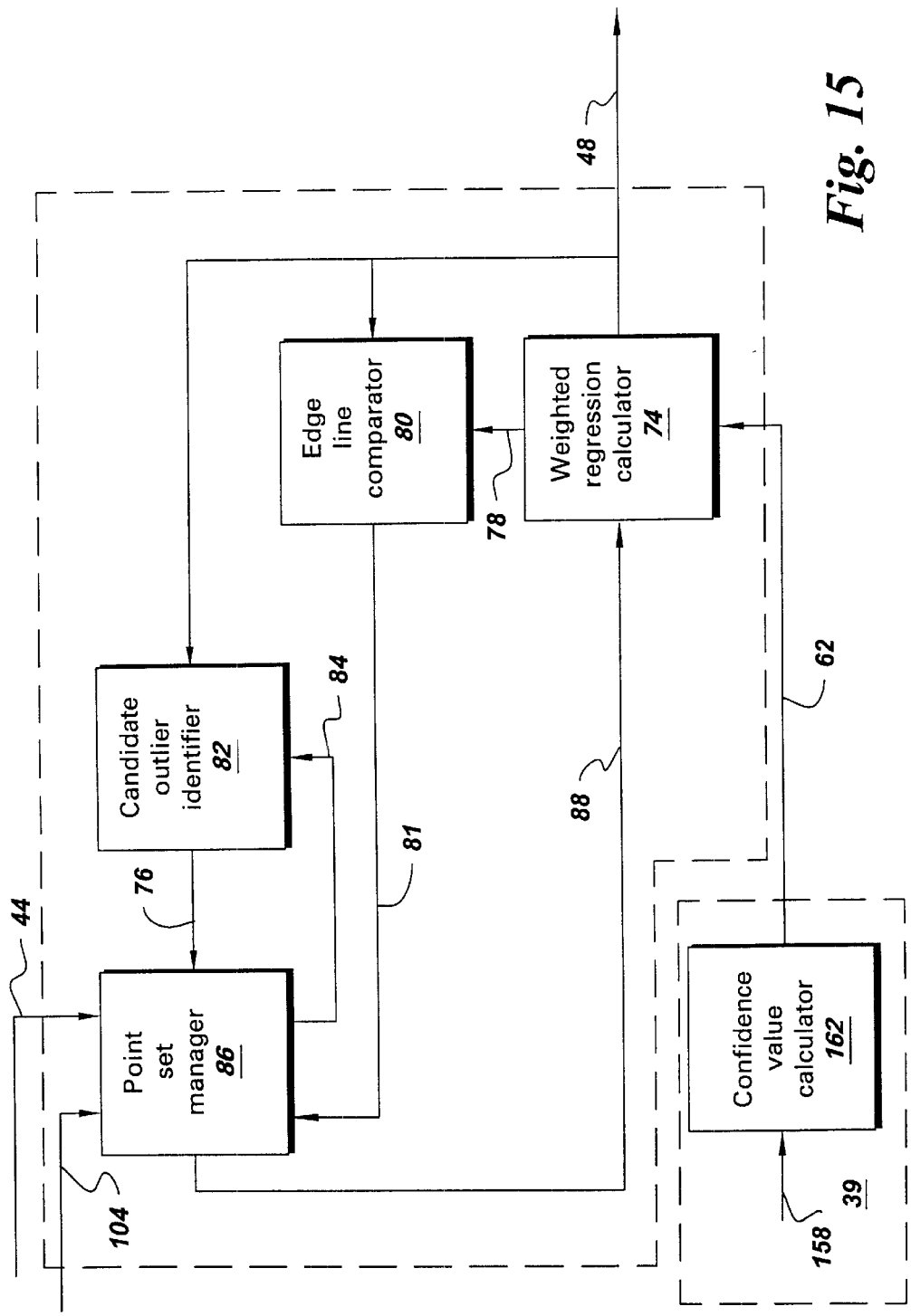
FIG. 15 is a block diagram of another more specific embodiment of the present invention in accordance with the embodiment of FIG. 5.

In accordance with the embodiment of FIG. 5, FIG. 15 is a block diagram of another more specific embodiment of the present invention wherein edge point locator 39 comprises a confidence value calculator 162 for calculating a plurality of confidence values 62 and edge line computer 46 comprises. a weighted regression calculator 74 for calculating a weighted linear regression weighted by confidence values 62. In typical embodiments, line segment offsets 158 are used to calculate confidence values 62, with a greater spread among line segment offsets 158 giving rise to lower confidence values 62.

In another more specific embodiment in accordance with the embodiment of FIG. 15, edge line computer 46 further comprises a candidate outlier identifier 82, a weighted regression calculator 74, an edge line comparator 80, and a point set manager 86. Candidate outlier identifier 82 identifies a candidate outlier 76 from a previous edge line 48 and a previous point set 84. From a new point set 88, weighted regression calculator 74 calculates a new edge line 78. Edge line comparator 80 compares new edge line 78 to previous edge line 48 to yield an edge line difference 81. Point set manager 86 creates previous point set 84 from historical point set 44, excludes candidate outlier 76 from previous point set 84 to yield new point set 88, and, whenever edge line difference 81 exceeds a prescribed error tolerance 104, replaces previous point set 84 with new point set 88. In typical embodiments, candidate outlier identifier 82 identifies a candidate outlier 76 by selecting an element of previous point set 84 farthest from previous edge line 48.

Figure 16:
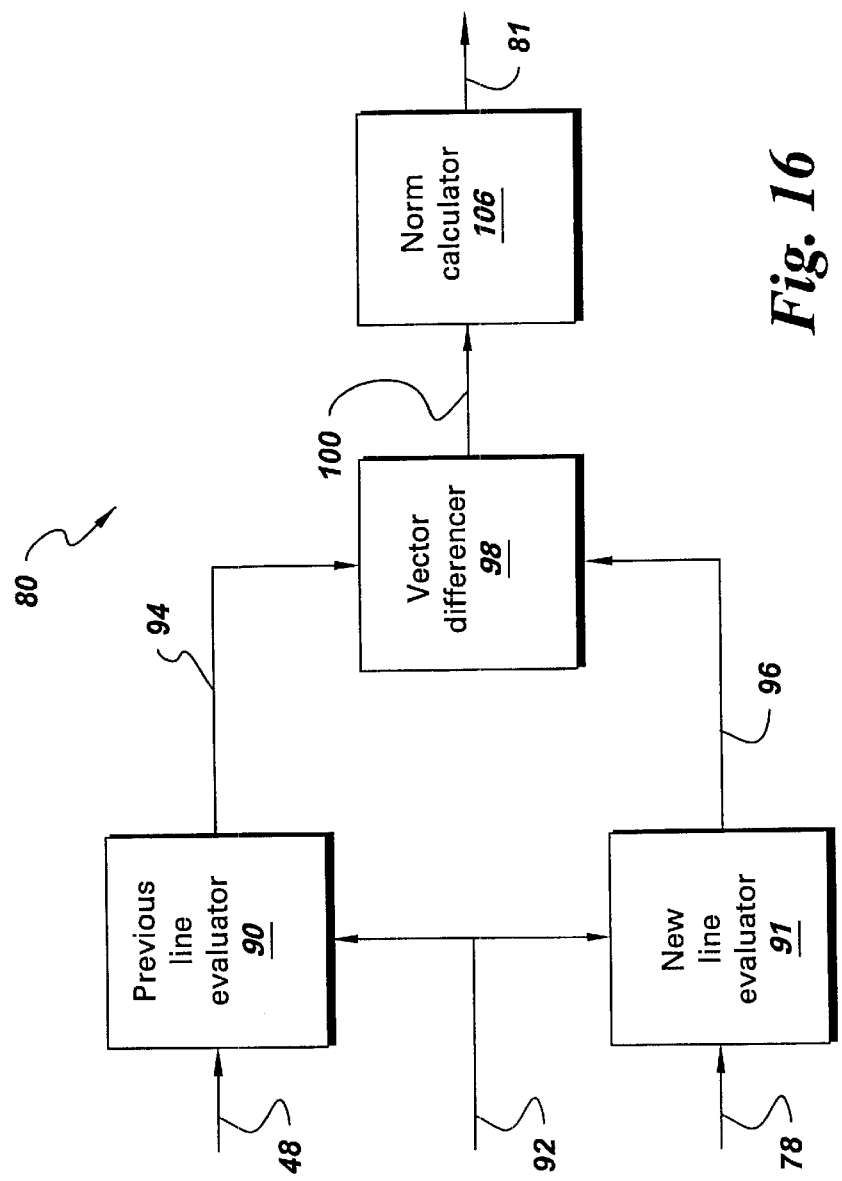
FIG. 16 is a block diagram of a more specific embodiment of the present invention in accordance with the embodiment of FIG. 15.

In accordance with the embodiment of FIG. 15, FIG. 16 is a block diagram of a more specific embodiment of the present invention wherein edge line comparator 80 comprises a previous line evaluator 90, a new line evaluator 91, a vector differencer 98, and a norm calculator 106. Previous line evaluator 90 evaluates previous edge line 48 at a vector of prescribed abscissas 92 to yield a vector of previous ordinates 94. Similarly, new line evaluator 91 evaluates new edge line 78 at vector of prescribed abscissas 92 to yield a vector of new ordinates 96. Vector differencer 98 subtracts vector of previous ordinates 94 from vector of new ordinates 96 to yield an error vector 100 having a plurality of error vector elements. Norm calculator 106 calculates an error norm of error vector 100 to yield edge line difference 81. In typical embodiments, norm calculator 106 calculates the error norm of error vector 100 by a method comprising finding a square root of a sum of squares of all error vector elements. In alternative embodiments, norm calculator 106 calculates the error norm of error vector 100 by a method comprising finding a maximum value among absolute values of all error vector elements.

Figure 17:
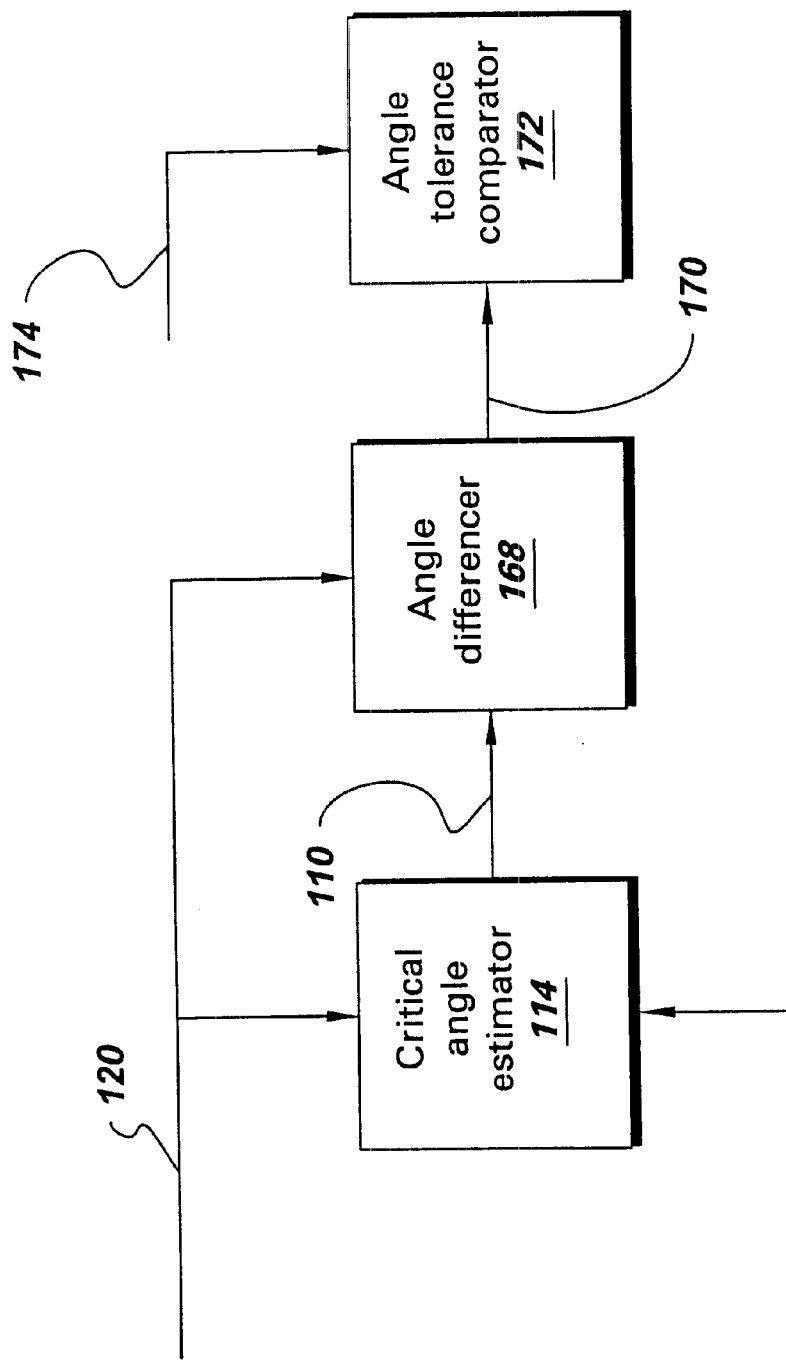
FIG. 17 is a block diagram of an apparatus for detecting a tilted object in accordance with another embodiment of the present invention.

In accordance with another embodiment of the present invention, FIG. 17 is a block diagram of an apparatus for detecting a tilted object. The apparatus comprises a critical angle estimator 114, an angle differencer 168, and an angle tolerance comparator 172. Critical angle estimator 114 estimates a critical angle 110 from a video image 37. Angle differencer 168 differences critical angle 110 from a reference angle of reference ray 120 to yield an error angle 170, and angle tolerance comparator 172 compares an absolute value of error angle 170 to an angle error tolerance 174. In the event angle error tolerance 174 is exceeded, a tilted object is detected and lifting operations, especially at the onset of lifting, may typically be halted. Specific embodiments of critical angle estimator 114 as discussed above with reference to FIGS. 8, 9, and 10 are equally applicable to the embodiment of the present invention in accordance with FIG. 17.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:

1. A system for lifting objects comprising:
   a robotic manipulator;
   a distance sensor adapted to acquire object height measurements of said objects;
   a light plane projector adapted to illuminate said objects;
   a video camera adapted to acquire video images of said objects; and
   a control processor adapted to process said video images and said object height measurements and provide control signals to said robotic manipulator by implementing a polygonal object location method to provide position command signals to said Cartesian manipulator,
   said polygonal object location method comprising:
      acquiring a video image of said polygonal object using a machine vision system, at least one component of said machine vision system being disposed on a component carrying link of a robotic manipulator;
      locating, in said video image, a new edge point corresponding to a respective edge of said polygonal object;
      incorporating said new edge point into a historical point set;
      computing a plurality of edge lines from said historical point set;
      computing a polygon center from said edge lines; and
      commanding said robotic manipulator to move an end effector toward said polygon center by moving said component carrying link.

2. The system of claim 1 wherein:
   said video camera comprises an optical bandpass filter having a wavelength pass band; and
   said structured light projector comprises a monochromatic light source having a wavelength within said wavelength pass band.

3. The system of claim 2, wherein said wavelength pass band begins at about 520 nanometers and ends at about 540 nanometers.

4. The system of claim 2 wherein said monochromatic light source comprises a laser.

5. A system for lifting objects comprising:
   a gantry crane;
   a distance sensor disposed on a trolley of said gantry crane;
   a light plane projector disposed on said trolley of said gantry crane;
   a video camera disposed on a bridge of said gantry crane; and
   a control processor adapted to process video images from said video camera and object height measurements from said distance sensor and provide control signals to said gantry crane by implementing a polygonal object location method to provide position command signals to said Cartesian manipulator,
   said polygonal object location method comprising:
      acquiring a video image of said polygonal object using a machine vision system, at least one component of said machine vision system being disposed on a component carrying link of a robotic manipulator;
      locating, in said video image, a new edge point corresponding to a respective edge of said polygonal object;
      incorporating said new edge point into a historical point set;
      computing a plurality of edge lines from said historical point set;
      computing a polygon center from said edge lines; and
      commanding said robotic manipulator to move an end effector toward said polygon center by moving said component carrying link.

6. The system of claim 5 wherein:
   said video camera comprises an optical bandpass filter having a wavelength pass band; and
   said structured light projector comprises a monochromatic light source having a wavelength within said wavelength pass band.

7. The system of claim 6 wherein said wavelength pass band begins at about 520 nanometers and ends at about 540 nanometers.

8. The system of claim 6 wherein said monochromatic light source comprises a laser.

9. A method of lifting objects comprising:
   projecting a light plane to illuminate said objects;
   acquiring video images of said objects;
   providing object height measurements of said objects; and
   processing said video images and said object height measurements using a polygonal object location algorithm to provide position command signals to a robotic manipulator,
   said polygonal object location method comprising:
      acquiring a video image of said polygonal object using a machine vision system, at least one component of said machine vision system being disposed on a component carrying link of a robotic manipulator;
      locating, in said video image, a new edge point corresponding to a respective edge of said polygonal object;
      incorporating said new edge point into a historical point set;
      computing a plurality of edge lines from said historical point set;
      computing a polygon center from said edge lines; and
      commanding said robotic manipulator to move an end effector toward said polygon center by moving said component carrying link.

10. The method of claim 9 wherein:
    providing said video images further comprises optical bandpass filtering using an optical filter having a wavelength pass band; and projecting said light plane comprises producing a monochromatic light having a wavelength within said wavelength pass band.

11. The method of claim 10 wherein said wavelength pass band begins at about 520 nanometers and ends at about 540 nanometers.

12. The method of claim 10 wherein producing said monochromatic light comprises using a laser.

13. A method of lifting objects comprising:
projecting a light plane to illuminate said objects using a light plane projector;
acquiring video images of said objects using a video camera;
providing object height measurements of said objects; and
processing said video images and said object height measurements using a polygonal object location algorithm to provide position command signals to a gantry crane,
said light plane projector being disposed on a trolley of said gantry crane,
said video camera being disposed on a bridge of said gantry crane,
said polygonal object location method comprising:
acquiring a video image of said polygonal object using a machine vision system, at least one component of said machine vision system being disposed on a component carrying link of a robotic manipulator;
locating, in said video image, a new edge point corresponding to a respective edge of said polygonal object;
incorporating said new edge point into a historical point set;
computing a plurality of edge lines from said historical point set;
computing a polygon center from said edge lines; and
commanding said robotic manipulator to move an end effector toward said polygon center by moving said component carrying link.

14. The method of claim 13 wherein:
providing said video images further comprises optical bandpass filtering using an optical filter having a wavelength pass band; and
projecting said light plane comprises producing a monochromatic light having a wavelength within said wavelength pass band.

15. The method of claim 14 wherein said wavelength pass band begins at about 520 nanometers and ends at about 540 nanometers.

16. The method of claim 14 wherein producing a monochromatic light comprises using a laser.

17. A method of locating a polygonal object comprising:
acquiring a video image of said polygonal object using a machine vision system, at least one component of said machine vision system being disposed on a component carrying link of a robotic manipulator;
locating, in said video image, a new edge point corresponding to a respective edge of said polygonal object;
incorporating said new edge point into a historical point set;
computing a plurality of edge lines from said historical. point set;
computing a polygon center from said edge lines; and
commanding said robotic manipulator to move an end effector toward said polygon center by moving said component carrying link.

18. The method of claim 17 wherein:
acquiring said video image of said polygonal object comprises projecting a light plane to intersect a horizontal face of said polygonal object whereby said video image comprises at least one structured light line; and
locating said new edge point further comprises detecting a line break in said structured light line.

19. The method of claim 17 wherein detecting said line break comprises:
estimating a critical angle;
estimating a critical offset using said critical angle; and
finding a line segment endpoint using said critical angle and said critical offset.

20. The method of claim 19 wherein estimating said critical angle comprises:
computing, from said video image, a projection array having a plurality of projection array rows and a plurality of projection array columns, said projection array columns respectively corresponding to a plurality of projection angles and each comprising a plurality of column elements;
computing a plurality of angular performance values from said projection array columns; and
finding a maximum performance value among said angular performance values, said maximum performance value corresponding to said critical angle.

21. The method of claim 20 wherein computing said plurality of angular performance values comprises finding a plurality of maximum column values among said column elements of respective ones of said projection array columns.

22. The method of claim 20 wherein computing each of said plurality of angular performance values comprises:
forming a plurality of column element differences from said column elements of a respective projection array column; and
calculating a square root of a sum of squares of all of said column element differences.

23. The method of claim 19 wherein estimating said critical offset comprises:
computing, from said video image, a plurality of critical angle projection values at said critical angle;
finding, among said critical angle projection values, at least one relative maximum projection value respectively corresponding ,to at least one relative maximum offset; and
selecting said critical offset among said at least one relative maximum offset.

24. The method of claim 23 wherein selecting said critical offset comprises:
providing a reference ray having a reference offset; and
finding said critical offset, said critical offset being closest to said reference offset among said at least one relative maximum offset.

25. The method of claim 19 wherein finding said line segment endpoint comprises:
masking said video image in a neighborhood of a line defined by said critical angle and said critical offset to yield a masked image;
computing a plurality of orthogonal projection values in a direction orthogonal to said critical angle;
detecting a plurality of line segment offsets whereat said orthogonal projection values cross respective ones of a plurality of end point threshold values in a direction defined by a reference ray; and selecting said line segment endpoint among said line segment offsets.

26. The method of claim 25 further comprising calculating a confidence value from said line segment offsets and wherein computing said plurality of edge lines from said historical point set comprises calculating a weighted linear regression wherein each new edge point is weighted by a respective confidence value.

27. The method of claim 17 wherein:

said new edge point comprises a confidence value; and computing said plurality of edge lines from said historical point set comprises calculating a weighted linear regression wherein each new edge point is weighted by a respective confidence value.

28. The method of claim 17 wherein computing said set of edge lines further comprises refining to exclude outliers, said refining comprising:

creating a previous point set from said historical point set;

identifying a candidate outlier from a previous edge line and said previous point set;

excluding said candidate outlier from said previous point set to yield a new point set;

calculating a new edge line from said new point set;

comparing said new edge line to said previous edge line to yield an edge line difference; and replacing said previous point set with said new point set whenever said edge line difference exceeds a prescribed error tolerance.

29. The method of claim 28 wherein identifying said candidate outlier comprises finding an element of said previous point set farthest from said previous edge line.

30. The method of claim 28 wherein comparing said new edge line to said previous edge line comprises:

evaluating said previous edge line at a vector of prescribed abscissas to yield a vector of previous ordinates;

evaluating said new edge line at said vector of prescribed abscissas to yield a vector of new ordinates;

subtracting said vector of previous ordinates from said vector of new ordinates to yield an error vector having a plurality of error vector elements; and calculating an error norm of said error vector to yield said edge line difference.

31. The method of claim 30 wherein calculating said error norm of said error vector comprises finding a square root of a sum of squares of all said error vector elements.

32. The method of claim 30 wherein calculating said error norm of said error vector comprises finding a maximum value among absolute values of all said error vector elements.

33. A projection-based method of locating a polygonal object comprising:

acquiring a video image of said polygonal object using a machine vision system, at least one component of said machine vision system being disposed on a component carrying link of a robotic manipulator;

projecting a light plane to intersect a horizontal face of said polygonal object whereby said video image comprises at least one structured light line;

computing, from said video image, a projection array having a plurality of projection array rows and a plurality of projection array columns, said projection array columns respectively corresponding to a plurality of projection angles and each comprising a plurality of column elements;

computing a plurality of angular performance values from said projection array columns;

finding a maximum performance value among said angular performance values, said maximum performance value corresponding to a critical angle;

computing, from said video image, a plurality of critical angle projection values at said critical angle;

finding, among said critical angle projection values, at least one relative maximum projection value respectively corresponding to at least one relative maximum offset;

selecting a critical offset among said at least one relative maximum offset;

masking said video image in a neighborhood of a line defined by said critical angle and said critical offset to yield a masked image;

computing a plurality of orthogonal projection values -in a direction orthogonal to said critical angle;

detecting a plurality of line segment offsets whereat said orthogonal projection values cross respective ones of a plurality of end point threshold values in a direction defined by a reference ray;

selecting a line segment endpoint among said line segment offsets;

locating a new edge point from said critical angle, said critical offset, and said line segment endpoint;

incorporating said new edge point into a historical point set;

computing a plurality of edge lines from said historical point set;

computing a polygon center from said edge lines; and commanding said robotic manipulator to move an end effector toward said polygon center by moving said component carrying link.

34. The method of claim 33 wherein computing said plurality of angular performance values comprises finding a plurality of maximum column values among said column elements of respective ones of said projection array columns.

35. The method of claim 33 wherein computing each of said plurality of angular performance values comprises:

forming a plurality of column element differences from said column elements of a respective projection array column; and calculating a square root of a sum of squares of all of said column element differences.

36. The method of claim 33 wherein selecting said critical offset comprises finding, among said at least one relative maximum offset, a closest offset to a reference offset of said reference ray.

37. The method of claim 33 further comprising calculating a confidence value from said line segment offsets and wherein computing said plurality of edge lines from said historical point set comprises calculating a weighted linear regression wherein each new edge point is weighted by a respective confidence value.

38. The method of claim 33 wherein:

said new edge point comprises a confidence value; and computing said plurality of edge lines from said historical point set comprises calculating a weighted linear regression wherein each new edge point is weighted by a respective confidence value.

39. The method of claim 33 wherein computing said set of edge lines further comprises refining to exclude outliers, said refining comprising:

creating a previous point set from said historical point set;

identifying a candidate outlier from a previous edge line and said previous point set;

excluding said candidate outlier from said previous point set to yield a new point set;

calculating a new edge line from said new point set;

comparing said new edge line to said previous edge line to yield an edge line difference; and replacing said previous point set with said new point set whenever said edge line difference exceeds a prescribed error tolerance.

40. The method of claim 39 wherein identifying said candidate outlier comprises:

finding an element of said previous point set farthest from said previous edge line.

41. The method of claim 39 wherein comparing said new edge line to said previous edge line comprises:

evaluating said previous edge line at a vector of prescribed abscissas to yield a vector of previous ordinates;

evaluating said new edge line at said vector of prescribed abscissas to yield a vector of new ordinates;

subtracting said vector of previous ordinates from said vector of new ordinates to yield an error vector having a plurality of error vector elements; and calculating an error norm of said error vector to yield said edge line difference.

42. The method of claim 41 wherein calculating said error norm of said error vector comprises finding a square root of a sum of squares of all said error vector elements.

43. The method of claim 41 wherein calculating said error norm of said error vector comprises finding a maximum value among absolute values of all said error vector elements.

44. An apparatus for locating a polygonal object comprising:

a machine vision system for acquiring a video image of said polygonal object, at least one component of said machine vision system being disposed on a component carrying link of a robotic manipulator;

an edge point locator for locating, in said video image, a new edge point corresponding to a respective edge of said polygonal object;

an edge point accumulator for incorporating said new edge point into a historical point set;

an edge line computer for computing a plurality of edge lines from said historical point set;

a polygon center computer for computing a polygon center from said edge lines; and a manipulator command generator for commanding said robotic manipulator to move an end effector toward said polygon center by moving 'said component carrying link.

45. The apparatus of claim 44 wherein:

said machine vision system comprises a light plane projector for projecting a light plane to intersect a horizontal face of said polygonal object whereby said video image comprises at least one structured light line; and said edge point locator comprises a line break detector for detecting a line break in said structured light line.

46. The apparatus of claim 44 wherein said line break detector comprises:

a critical angle estimator for estimating a critical angle;

a critical offset estimator for estimating a critical offset using said critical angle; and an end point finder for finding said new edge point using said critical angle and said critical offset.

47. The apparatus of claim 46 wherein said critical angle estimator comprises:

a projection array computer for computing, from said video image, a projection array having a plurality of projection array rows and a plurality of projection array columns, said projection array columns respectively corresponding to a plurality of projection angles and each comprising a plurality of column elements;

an angular performance evaluator for computing a plurality of angular performance values from said projection array columns; and a maximum finder for finding a maximum performance value among said angular performance values, said maximum performance value corresponding to said critical angle.

48. The apparatus of claim 47 wherein said angular performance evaluator is adapted to compute said plurality of angular performance values by a method comprising finding a plurality of maximum column values among said column elements of respective ones of said projection array columns.

49. The apparatus of claim 47 wherein said angular performance evaluator is adapted to compute each of said plurality of angular performance values by a method comprising:

forming a plurality of column element differences from said column elements of a respective projection array column; and calculating a square root of a sum of squares of all of said column element differences.

50. The apparatus of claim 46 wherein said critical offset estimator comprises:

a projection value computer for computing, from said video image, a plurality of critical angle projection values at said critical angle;

a maximum finder for finding, among said critical angle projection values, at least one relative maximum projection value respectively corresponding to at least one relative maximum offset; and a maximum selector for selecting said critical offset among said at least one relative maximum offset.

51. The apparatus of claim 50 wherein said maximum selector is adapted to select said critical offset by a method comprising:

providing a reference ray having a reference offset; and finding said critical offset, said critical offset being closest to said reference offset among said at least one relative maximum offset.

52. The apparatus of claim 46 wherein said end point finder comprises:

an image masker for masking said video image in a neighborhood of a line defined by said critical angle and said critical offset to yield a masked image;

an orthogonal projection computer for computing a plurality of orthogonal projection values in a direction orthogonal to said critical angle;

a threshold crossing detector for detecting a plurality of line segment offsets whereat said orthogonal projection values cross respective ones of a plurality of end point threshold values in a direction defined by a reference ray; and an end point selector for selecting said line segment endpoint among said line segment offsets.

53. The apparatus of claim 52 further comprising a confidence value calculator for calculating a confidence value from said line segment offsets, and wherein said edge line computer comprises a weighted regression calculator for calculating a weighted linear regression wherein each new edge point is weighted by a respective confidence value.

54. The apparatus of claim 44 wherein:
   said edge point locator comprises a confidence value calculator for calculating a plurality of confidence values; and
   said edge line computer comprises a weighted regression calculator for calculating a weighted linear regression wherein each new edge point is weighted by a respective confidence value.

55. The apparatus of claim 44 wherein said edge line computer further comprises:
   a candidate outlier identifier for identifying a candidate outlier from a previous edge line and a previous point set;
   a weighted regression calculator for calculating a new edge line from a new point set;
   an edge line comparator for comparing said new edge line to said previous edge line to yield an edge line difference; and
   a point set manager for creating said previous point set from said historical point set, excluding said candidate outlier from said previous point set to yield said new point set, and, whenever said edge line difference exceeds a prescribed error tolerance, replacing said previous point set with said new point set.

56. The apparatus of claim 55 wherein said candidate outlier identifier is adapted to identify said candidate outlier by a method comprising finding an element of said previous point set farthest from said previous edge line.

57. The apparatus of claim 55 wherein said edge line comparator comprises:
   a previous line evaluator for evaluating said previous edge line at a vector of prescribed abscissas to yield a vector of previous ordinates;
   a new line evaluator for evaluating said new edge line at said vector of prescribed abscissas to yield a vector of new ordinates;
   a vector differencer for subtracting said vector of previous ordinates from said vector of new ordinates to yield an error vector having a plurality of error vector elements; and
   a norm calculator for calculating an error norm of said error vector to yield said edge line difference.

58. The apparatus of claim 57 wherein said norm calculator is adapted to calculate said error norm of said error vector by a method comprising finding a square root of a sum of squares of all said error vector elements.

59. The apparatus of claim 57 wherein said norm calculator is adapted to calculate said error norm of said error vector by a method comprising finding a maximum value among absolute values of all said error vector elements.

60. An apparatus for locating a polygonal object comprising:
   a machine vision system for acquiring a video image of said polygonal object, at least one component of said machine vision system being disposed on a component carrying link of a robotic manipulator;
   a light plane projector for projecting a light plane to intersect a horizontal face of said polygonal object whereby said video image comprises at least one structured light line;
   a projection array computer for computing, from said video image, a projection array having a plurality of projection array rows and a plurality of projection array columns, said projection array columns respectively corresponding to a plurality of projection angles and each comprising a plurality of column elements;
   an angular performance evaluator for computing a plurality of angular performance values from said projection array columns;
   a maximum finder for finding a maximum performance value among said angular performance values, said maximum performance value corresponding to a critical angle;
   a projection value computer for computing, from said video image, a plurality of critical angle projection values at said critical angle;
   a maximum finder for finding, among said critical angle projection values, at least one relative maximum projection value respectively corresponding to at least one relative maximum offset;
   a maximum selector for selecting a critical offset among said at least one relative maximum offset;
   an image masker for masking said video image in a neighborhood of a line defined by said critical angle and said critical offset to yield a masked image;
   an orthogonal projection computer for computing a plurality of orthogonal projection values in a direction orthogonal to said critical angle;
   a threshold crossing detector for detecting a plurality of line segment offsets whereat said orthogonal projection values cross respective ones of a plurality of end point threshold values in a direction defined by a reference ray;
   an end point selector for selecting a line segment endpoint among said line segment offsets;
   an edge point computer for locating a new edge point from said critical angle, said critical offset, and said line segment endpoint;
   an edge point accumulator for incorporating said new edge point into a historical point set;
   an edge line computer for computing a plurality of edge lines from said historical point set;
   a polygon center computer for computing a polygon center from said edge lines; and
   a manipulator command generator for commanding said robotic manipulator to move an end effector toward said polygon center by moving said component carrying link.

61. The apparatus of claim 60 wherein said angular performance evaluator is adapted to compute said plurality of angular performance values by a method comprising finding a plurality of maximum column values among said column elements of respective ones of said projection array columns.

62. The apparatus of claim 60 wherein said angular performance evaluator is adapted to compute each of said plurality of angular performance values by a method comprising:
   forming a plurality of column element differences from said column elements of a respective projection array column; and
   calculating a square root of a sum of squares of all of said column element differences.

63. The apparatus of claim 60 wherein said maximum selector is adapted to select said critical offset by a method comprising:
   providing a reference ray having a reference offset; and
   finding said critical offset, said critical offset being closest to said reference offset among said at least one relative maximum offset.

64. The apparatus of claim 60 further comprising a confidence value calculator for calculating a confidence value from said line segment offsets, and wherein said edge line computer comprises a weighted regression calculator for calculating a weighted linear regression wherein each new edge point is weighted by a respective confidence value.

65. The apparatus of claim 60 wherein:
   said edge point locator comprises a confidence value calculator for calculating a plurality of confidence values; and
   said edge line computer comprises a weighted regression calculator for calculating a weighted linear regression wherein each new edge point is weighted by a respective confidence value.

66. The apparatus of claim 60 wherein said edge line computer further comprises:
   a candidate outlier identifier for identifying a candidate outlier from a previous edge line and a previous point set;
   a weighted regression calculator for calculating a new edge line from a new point set;
   an edge line comparator for comparing said new edge line to said previous edge line to yield an edge line difference; and
   a point set manager for creating said previous point set from said historical point set, excluding said candidate outlier from said previous point set to yield said new point set, and, whenever said edge line difference exceeds a prescribed error tolerance, replacing said previous point set with said new point set.

67. The apparatus of claim 66 wherein said candidate outlier identifier is adapted to identify said candidate outlier by a method comprising finding an element of said previous point set farthest from said previous edge line.

68. The apparatus of claim 66 wherein said edge line comparator comprises:
   a previous line evaluator for evaluating said previous edge line at a vector of prescribed abscissas to yield a vector of previous ordinates;
   a new line evaluator for evaluating said new edge line at said vector of prescribed abscissas to yield a vector of new ordinates;
   a vector differencer for subtracting said vector of previous ordinates from said vector of new ordinates to yield an error vector having a plurality of error vector elements; and
   a norm calculator for calculating an error norm of said error vector to yield said edge line difference.

69. The apparatus of claim 68 wherein said norm calculator is adapted to calculate said error norm of said error vector by a method comprising finding a square root of a sum of squares of all said error vector elements.

70. The apparatus of claim 68 wherein said norm calculator is adapted to calculate said error norm of said error vector by a method comprising finding a maximum value among absolute values of all said error vector elements.

71. A method of detecting a tilted object comprising:
   providing a reference ray having a reference angle;
   estimating a critical angle from a video image;
   differencing said critical angle from said reference angle of said reference ray to yield an error angle; and
   comparing an absolute value of said error angle to an angle error tolerance.

72. The method of claim 71 wherein estimating said critical angle comprises:
   computing, from said video image, a projection array having a plurality of projection array rows and a plurality of projection array columns, said projection array columns respectively corresponding to a plurality of projection angles and each comprising a plurality of column elements;
   computing a plurality of angular performance values from said projection array columns; and
   finding a maximum performance value among said angular performance values, said maximum performance value corresponding to said critical angle.

73. The method of claim 72 wherein computing said plurality of angular performance values comprises finding a plurality of maximum column values among said column elements of respective ones of said projection array columns.

74. The method of claim 72 wherein computing each of said plurality of angular performance values comprises
   forming a plurality of column element differences from said column elements of a respective projection array column; and
   calculating a square root of a sum of squares of all of said column element differences.

75. A method of detecting a tilted object comprising:
   providing a reference ray having a reference angle;
   computing, from said video image, a projection array having a plurality of projection array rows and a plurality of projection array columns, said projection array columns respectively corresponding to a plurality of projection angles and each comprising a plurality of column elements;
   computing a plurality of angular performance values from said projection array columns; and
   finding a maximum performance value among said angular performance values, said maximum performance value corresponding to a critical angle and thereby estimating said critical angle;
   differencing said critical angle from said reference angle of said reference ray to yield an error angle; and
   comparing an absolute value of said error angle to an angle error tolerance.

76. The method of claim 75 wherein computing said plurality of angular performance values comprises finding a plurality of maximum column values among said column elements of respective ones of said projection array columns.

77. The method of claim 75 wherein computing each of said plurality of angular performance values comprises:
   forming a plurality of column element differences from said column elements of a respective projection array column; and
   calculating a square root of a sum of squares of all of said column element differences.

78. An apparatus for detecting a tilted object comprising:
   a critical angle estimator for estimating a critical angle from a video image;
   an angle differencer for differencing said critical angle from a reference angle of a reference ray to yield an error angle; and an angle tolerance comparator for comparing an absolute value of said error angle to an angle error tolerance.

79. The apparatus of claim 71 wherein said critical angle estimator comprises:

a projection array computer for computing, from said video image, a projection array having a plurality of projection array rows and a plurality of projection array columns, said projection array columns respectively corresponding to a plurality of projection angles and each comprising a plurality of column elements;

an angular performance evaluator for computing a plurality of angular performance values from said projection array columns; and a maximum finder for finding a maximum performance value among said angular performance values, said maximum performance value corresponding to said critical angle.

80. The apparatus of claim 79 wherein said angular performance evaluator is adapted to compute said plurality of angular performance values by a method comprising finding a plurality of maximum column values among said column elements of respective ones of said projection array columns.

81. The apparatus of claim 79 wherein said angular performance evaluator is adapted to compute each of said plurality of angular performance values by a method comprising:

forming a plurality of column element differences from said column elements of a respective projection array column; and calculating a square root of a sum of squares of all of said column element differences.

82. An apparatus for detecting a tilted object comprising:

a projection array computer for computing, from said video image, a projection array having a plurality of projection array rows and a plurality of projection array columns, said projection array columns respectively corresponding to a plurality of projection angles and each comprising a plurality of column elements;

an angular performance evaluator for computing a plurality of angular performance values from said projection array columns; and a maximum finder for finding a maximum performance value among said angular performance values, said maximum performance value corresponding to a critical angle thereby estimating said critical angle;

an angle differencer for differencing said critical angle from a reference angle of a reference ray to yield an error angle; and an angle tolerance comparator for comparing an absolute value of said error angle to an angle error tolerance.

83. The apparatus of claim 82 wherein said angular performance evaluator is adapted to compute said plurality of angular performance values by a method comprising finding a plurality of maximum column values among said column elements of respective ones of said projection array columns.

84. The apparatus of claim 82 wherein said angular performance evaluator is adapted to compute each of said plurality of angular performance values by a method comprising:

forming a plurality of column element differences from said column elements of a respective projection array column; and calculating a square root of a sum of squares of all of said column element differences.

85. A system for lifting objects comprising:

a Cartesian manipulator;

a machine vision system adapted to acquire video images of said objects; and a control processor adapted to process said video images and provide position command signals to said Cartesian manipulator, said machine vision system comprising:

a structured light projector for illuminating said objects and a video camera adapted to acquire said video images of said illuminated objects, said structured light projector being disposed on a first link of said Cartesian manipulator, said video camera being disposed on a second link of said Cartesian manipulator, said first link being different from said second link.

86. The system of claim 85 wherein said control processor is further adapted to implement a polygonal object location method to provide position command signals to said Cartesian manipulator, said polygonal object location method comprising:

acquiring a video image of said polygonal object using a machine vision system, at least one component of said machine vision system being disposed on a component carrying link of a robotic manipulator;

locating, in said video image, a new edge point corresponding to a respective edge of said polygonal object;

incorporating said new edge point into a historical point set;

computing a plurality of edge lines from said historical point set;

computing a polygon center from said edge lines; and commanding said robotic manipulator to move an end effector toward said polygon center by moving said component carrying link.

87. The system of claim 85 wherein said Cartesian manipulator comprises a gantry crane.

88. The system of claim 85 wherein said structured light projector comprises a light plane projector.

89. The system of claim 88 further comprising a distance sensor adapted to acquire object height measurements of said objects and wherein said control processor is further adapted to process said object height measurements and implement a projection-based polygonal object location method to provide position command signals to said Cartesian manipulator, said projection-based polygonal object location method comprising:

acquiring a video image of said polygonal object using a machine vision system, at least one component of said machine vision system being disposed on a component carrying link of a robotic manipulator;

projecting a light plane to intersect a horizontal face of said polygonal object whereby said video image comprises at least one structured light line;

computing, from said video image, a projection array having a plurality of projection array rows and a plurality of projection array columns, said projection array columns respectively corresponding to a plurality of projection angles and each comprising a plurality of column elements;

computing a plurality of angular performance values from said projection array columns;

finding a maximum performance value among said angular performance values, said maximum performance value corresponding to a critical angle;

computing, from said video image, a plurality of critical angle projection values at said critical angle;
finding, among said critical angle projection values, at least one relative maximum projection value respectively corresponding to at least one relative maximum offset;
selecting a critical offset among said at least one relative maximum offset;
masking said video image in a neighborhood of a line defined by said critical angle and said critical offset to yield a masked image;
computing a plurality of orthogonal projection values in a direction orthogonal to said critical angle;
detecting a plurality of line segment offsets whereat said orthogonal projection values cross respective ones of a plurality of end point threshold values in a direction defined by a reference ray;
selecting a line segment endpoint among said line segment offsets;
locating a new edge point from said critical angle, said critical offset, and said line segment endpoint;
incorporating said new edge point into a historical point set;
computing a plurality of edge lines from said historical point set;
computing a polygon center from said edge lines; and
commanding said robotic manipulator to move an end effector toward said polygon center by moving said component carrying link.

90. The system of claim 85 wherein:
said video camera comprises an optical bandpass filter having a wavelength pass band; and
said structured light projector comprises a monochromatic light source having a wavelength within said wavelength pass band.

91. The system of claim 90 wherein said wavelength pass band begins at about 520 nanometers and ends at about 540 nanometers.

92. The system of claim 90 wherein said monochromatic light source comprises a laser.

93. A system for lifting objects comprising:
a Cartesian manipulator;
a machine vision system adapted to acquire video images of said objects; and
a control processor adapted to process said video images and provide position command signals to said Cartesian manipulator,
said machine vision system comprising:
a structured light projector for illuminating said objects and
a video camera adapted to acquire said video images of said illuminated objects,
said video camera comprising an optical bandpass filter having a wavelength pass band,
said structured light projector comprising a monochromatic light source having a wavelength within said wavelength pass band,
said wavelength pass band beginning at about 520 nanometers and ending at about 540 nanometers.

94. The system of claim 93 wherein said control processor is further adapted to implement a polygonal object location method to provide position command signals to said Cartesian manipulator,
said polygonal object location method comprising:
acquiring a video image of said polygonal object using a machine vision system, at least one component of said machine vision system being disposed on a component carrying link of a robotic manipulator;
locating, in said video image, a new edge point corresponding to a respective edge of said polygonal object;
incorporating said new edge point into a historical point set;
computing a plurality of edge lines from said historical point set;
computing a polygon center from said edge lines; and
commanding said robotic manipulator to move an end effector toward said polygon center by moving said component carrying link.

95. The system of claim 93 wherein said Cartesian manipulator comprises a gantry crane.

96. The system of claim 93 wherein said structured light projector comprises a light plane projector.

97. The system of claim 96 further comprising a distance sensor adapted to acquire object height measurements of said objects and wherein said control processor is further adapted to process said object height measurements and implement a projection-based polygonal object location method to provide position command signals to said Cartesian manipulator,
said projection-based polygonal object location method comprising:
acquiring a video image of said polygonal object using a machine vision system, at least one component of said machine vision system being disposed on a component carrying link of a robotic manipulator;
projecting a light plane to intersect a horizontal face of said polygonal object whereby said video image comprises at least one structured light line;
computing, from said video image, a projection array having a plurality of projection array rows and a plurality of projection array columns, said projection array columns respectively corresponding to a plurality of projection angles and each comprising a plurality of column elements;
computing a plurality of angular performance values from said projection array columns;
finding a maximum performance value among said angular performance values, said maximum performance value corresponding to a critical angle;
computing, from said video image, a plurality of critical angle projection values at said critical angle;
finding, among said critical angle projection values, at least one relative maximum projection value respectively corresponding to at least one relative maximum offset;
selecting a critical offset among said at least one relative maximum offset;
masking said video image in a neighborhood of a line defined by said critical angle and said critical offset to yield a masked image;
computing a plurality of orthogonal projection values in a direction orthogonal to said critical angle;
detecting a plurality of line segment offsets, whereat said orthogonal projection values cross respective ones of a plurality of end point threshold values in a direction defined by a reference ray;
selecting a line segment endpoint among said line segment offsets;
locating a new edge point from said critical angle, said critical offset, and said line segment endpoint;
incorporating said new edge point into a historical point set;

computing a plurality of edge lines from said historical point set;

computing a polygon center from said edge lines; and commanding said robotic manipulator to move an end effector toward said polygon center by moving said component carrying link.

98. The system of claim 93 wherein said monochromatic light source comprises a laser.

99. A method of lifting objects comprising:

acquiring video images of said objects using a video camera;

processing said video images so as to provide position command signals to a Cartesian manipulator;

projecting structured light onto said objects using a structured light projector, said structured light projector being disposed on a first link of said Cartesian manipulator, said video camera being disposed on a second link of said Cartesian manipulator, said first link being different from said second link.

100. The method of claim 99 wherein processing said video images comprises implementing a polygonal object location method to provide position command signals to said Cartesian manipulator, said polygonal object location method comprising:

acquiring a video image of said polygonal object using a machine vision system, at least one component of said machine vision system being disposed on a component carrying link of a robotic manipulator;

locating, in said video image, a new edge point corresponding to a respective edge of said polygonal object;

incorporating said new edge point into a historical point set;

computing a plurality of edge lines from said historical point set;

computing a polygon center from said edge lines; and commanding said robotic manipulator to move an end effector toward said polygon center by moving said component carrying link.

101. The method of claim 99 wherein said Cartesian manipulator comprises a gantry crane.

102. The method of claim 99 wherein said structured light comprises a light plane.

103. The method of claim 102 further comprising providing object height measurements of said objects and wherein processing said video images comprises implementing a projection-based polygonal object location method to provide position command signals to said Cartesian manipulator, said projection-based polygonal object location method comprising:

acquiring a video image of said polygonal object using a machine vision system, at least one component of said machine vision system being disposed on a component carrying link of a robotic manipulator;

projecting a light plane to intersect a horizontal face of said polygonal object whereby said video image comprises at least one structured light line;

computing, from said video image, a projection array having a plurality of projection array rows and a plurality of projection array columns, said projection array columns respectively corresponding to a plurality of projection angles and each comprising a plurality of column elements;

computing a plurality of angular performance values from said projection array columns;

finding a maximum performance value among said angular performance values, said maximum performance value corresponding to a critical angle;

computing, from said video image, a plurality of critical angle projection values at said critical angle;

finding, among said critical angle projection values, at least one relative maximum projection value respectively corresponding to at least one relative maximum offset;

selecting a critical offset among said at least one relative maximum offset;

masking said video image in a neighborhood of a line defined by said critical angle and said critical offset to yield a masked image;

computing a plurality of orthogonal projection values in a direction orthogonal to said critical angle;

detecting a plurality of line segment offsets whereat said orthogonal projection values cross respective ones of a plurality of end point threshold values in a direction defined by a reference ray;

selecting a line segment endpoint among said line segment offsets;

locating a new edge point from said critical angle, said critical offset, and said line segment endpoint;

incorporating said new edge point into a historical point set;

computing a plurality of edge lines from said historical point set;

computing a polygon center from said edge lines; and commanding said robotic manipulator to move an end effector toward said polygon center by moving said component carrying link.

104. The method of claim 99 wherein:

providing said video images further comprises optical bandpass filtering using an optical filter having a wavelength pass band; and projecting said structured light comprises producing a monochromatic light having a wavelength within said wavelength pass band.

105. The method of claim 104 wherein said wavelength pass band begins at about 520 nanometers and ends at about 540 nanometers.

106. The method of claim 104 wherein producing said monochromatic light comprises using a laser.

107. A method of lifting objects comprising:

acquiring video images of said objects using a video camera;

processing said. video images so as to provide position command signals to a Cartesian manipulator;

projecting structured light onto said objects using a structured light projector, said step of acquiring said video images comprising optical bandpass filtering using an optical filter having a wavelength pass band, said step of projecting said structured light comprising producing a monochromatic light having a wavelength within said wavelength pass band, said wavelength pass band beginning at about 520 nanometers and ending at about 540 nanometers.

108. The method of claim 107 wherein processing said video images comprises implementing a polygonal object location method to provide position command signals to said Cartesian manipulator, said polygonal object location method comprising:

acquiring a video image of said polygonal object using a machine vision system, at least one component of said machine vision system being disposed on a component carrying. link of a robotic manipulator;

locating, in said video image, a new edge point corresponding to a respective edge of said polygonal object;

incorporating said new edge point into a historical point set;

computing a plurality of edge lines from said historical point set;

computing a polygon center from said edge lines; and commanding said robotic manipulator to move an end effector toward said polygon center by moving said component carrying link.

109. The method of claim 107 wherein said Cartesian manipulator comprises a gantry crane.

110. The method of claim 107 wherein said structured light comprises a light plane.

111. The method of claim 110 further comprising providing object height measurements of said objects and wherein processing said video images comprises implementing a projection-based polygonal object location method to provide position command signals to said Cartesian manipulator, said projection-based polygonal object location method comprising:

acquiring a video image of said polygonal object using a machine vision system, at least one component of said machine vision system being disposed on a component carrying link of a robotic manipulator;

projecting a light plane to intersect a horizontal face of said polygonal object whereby said video image comprises at least one structured light line;

computing, from said video image, a projection array having a plurality of projection array rows and a plurality of projection array columns, said projection array columns respectively corresponding to a plurality of projection angles and each comprising a plurality of column elements;

computing a plurality of angular performance values from said projection array columns;

finding a maximum performance value among said angular performance values, said maximum performance value corresponding to a critical angle;

computing, from said video image, a plurality of critical angle projection values at said critical angle;

finding, among said critical angle projection values, at least one relative maximum projection value respectively corresponding to at least one relative maximum offset;

selecting a critical offset among said at least one relative maximum offset;

masking said video image in a neighborhood of a line defined by said critical angle and said critical offset to yield a masked image;

computing a plurality of orthogonal projection values in a direction orthogonal to said critical angle;

detecting a plurality of line segment offsets whereat said orthogonal projection values cross respective ones of a plurality of end point threshold values in a direction defined by a reference ray;

selecting a line segment endpoint among said line segment offsets;

locating a new edge point from said critical angle, said critical offset, and said line segment endpoint;

incorporating said new edge point into a historical point set;

computing a plurality of edge lines from said historical point set;

computing a polygon center from said edge lines; and commanding said robotic manipulator to move an end effector toward said polygon center by moving said component carrying link.

112. The method of claim 107 wherein producing said monochromatic light comprises using a laser.

* * * * *